(12) United States Patent
Zhang

(10) Patent No.: US 12,332,351 B2
(45) Date of Patent: Jun. 17, 2025

(54) TIME OF FLIGHT MEASUREMENT METHOD, CIRCUIT, APPARATUS, STORAGE MEDIUM, AND ELECTRONIC DEVICE

(71) Applicant: Suteng Innovation Technology Co., Ltd., Shenzhen (CN)

(72) Inventor: Feng Zhang, Shenzhen (CN)

(73) Assignee: Suteng Innovation Technology Co., Ltd., Shenzhen (CN)

( * ) Notice: Subject to any disclaimer, the term of this patent is extended or adjusted under 35 U.S.C. 154(b) by 60 days.

(21) Appl. No.: 18/408,115

(22) Filed: Jan. 9, 2024

(65) Prior Publication Data
US 2024/0142621 A1 May 2, 2024

Related U.S. Application Data

(63) Continuation of application No. PCT/CN2021/106890, filed on Jul. 16, 2021.

(51) Int. Cl.
*G01S 17/14* (2020.01)
*G01S 7/4865* (2020.01)

(52) U.S. Cl.
CPC ............ *G01S 17/14* (2020.01); *G01S 7/4865* (2013.01)

(58) Field of Classification Search
CPC ....................................................... G01S 17/14
USPC ......................................................... 327/158
See application file for complete search history.

(56) References Cited

U.S. PATENT DOCUMENTS

| 2014/0240692 A1 | 8/2014 | Tien et al. |
| 2018/0239307 A1 | 8/2018 | Tsutsumi et al. |
| 2020/0132842 A1 | 4/2020 | Yu |
| 2020/0408885 A1* | 12/2020 | Yin ...................... H03L 7/0816 |

FOREIGN PATENT DOCUMENTS

| CN | 101655384 A | 2/2010 |
| CN | 101866165 A | 10/2010 |
| CN | 102176004 A | 9/2011 |
| CN | 106168753 A | 11/2016 |

(Continued)

OTHER PUBLICATIONS

First Office Action of CN application No. 202180100044.X, dated Jul. 10, 2024.

(Continued)

*Primary Examiner* — Tomi Skibinski
(74) *Attorney, Agent, or Firm* — Ladas & Parry LLP

(57) ABSTRACT

The embodiments of this application disclose a time of flight measurement method, including: performing delay processing on an echo signal to obtain N delayed signals; generating X clock signals with different phases based on a multi-phase clock unit; performing delay latch on the N delayed signals based on each of the X clock signals; determining a to-be-processed time of flight based on the reference signal and each of the delay latch result; and determining a target time of flight based on the X to-be-processed time of flights, where the target time of flight is a time difference between emitting the reference signal and receiving the echo signal. With the embodiment of this application, the precision of measuring the time of flight of the echo signal can be effectively improved while saving costs and simplifying calculations.

12 Claims, 14 Drawing Sheets

(56) References Cited

FOREIGN PATENT DOCUMENTS

| | | |
|---|---|---|
| CN | 108389225 A | 8/2018 |
| CN | 109521666 A | 3/2019 |
| CN | 111033312 A | 4/2020 |
| CN | 111416619 A | 7/2020 |
| CN | 111487637 A | 8/2020 |
| CN | 112771408 A | 5/2021 |
| KR | 101827954 B1 | 2/2018 |

OTHER PUBLICATIONS

International Search Report for International Application PCT/CN2021/106890, dated Apr. 15, 2022.
Written Opinion of International Search Authority for International Application PCT/CN2021/106890, dated Apr. 15, 2022.

\* cited by examiner

TIME OF FLIGHT MEASUREMENT METHOD, CIRCUIT, APPARATUS, STORAGE MEDIUM, AND ELECTRONIC DEVICE

CROSS-REFERENCE TO RELATED APPLICATION

This application is a continuation of International Patent Application No. PCT/CN2021/106890, filed on Jul. 16, 2021, the disclosure of which is hereby incorporated by reference in its entirety.

TECHNICAL FIELD

Embodiments of this application relate to the field of time measurement, and in particular, to a time of flight measurement method, circuit, apparatus, storage medium, and electronic device.

BACKGROUND

A Time to Digital Convert (TDC) is a circuit that detects a time difference between an echo signal and a reference signal based on a clock signal, the TDC is widely used in fields such as LiDAR, consumer electronics, and medical care. A TDC chip circuit implemented by a gate circuit and a carry chain of a field programmable gate array (FPGA) has the advantages of low cost, short period, convenience, and flexibility. However, the time resolution of time measurement is greatly affected by a model, a process, and performance parameters of the TDC chip circuit. For example, TDC chip TDC-GP2, which is widely used in many applications, mainly depends on the minimum delay of the carry chain of the FPGA for the precision of the time difference. Therefore, in many applications with high time resolution requirements, due to cost or installation environment limitations, most TDC chip circuits in the related art are difficult to meet the requirements of high-resolution measurement.

SUMMARY

Embodiments of this application provide a time of flight measurement method, circuit, apparatus, storage medium, and electronic device, which can effectively improve the precision of measuring the time of flight of an echo signal while saving cost and simplifying calculation.

In a first aspect, embodiments of this application provide a time of flight measurement method, where the method includes:
  performing delay processing on an echo signal to obtain N delayed signals, where delay of each of the N delayed signals is uniformly increased by U, and U is a delay of a delay unit, and U is a natural number greater than 0;
  generating X clock signals with different phases based on a multi-phase clock unit, where X is a positive integer greater than or equal to 2;
  performing delay latching on each of the N delayed signals based on each clock signal separately, to generate X delay latching results;
  determining X to-be-processed time of flights corresponding to each of the X delay latching results based on a reference signal and each of the X delay latching results; and
  determining a target time of flight based on the X to-be-processed time of flights, where the target time of flight is a time difference between emitting the reference signal and receiving the echo signal.

In a second aspect, embodiments of this application provide another time of flight measurement method, including:
  performing multi-phase delay processing on an echo signal, to obtain X to-be-inputted signals with different phases, where X is a positive integer greater than or equal to 2;
  performing delay processing on the X to-be-inputted signals with different phases separately, to obtain N delayed signals corresponding to each of the X to-be-inputted signals, where delay of each of the N delayed signals is uniformly increased by U, each N delayed signals form a group of delayed signals, and U is a delay of a delay unit, and U is a natural number greater than 0;
  performing delay latching on each group of the N delayed signals based on each clock signal separately, to generate X delay latching results;
  determining X to-be-processed time of flights corresponding to each of the X delay latching results based on a reference signal and each of the X delay latching results; and
  determining a target time of flight based on the X to-be-processed time of flights, where the target time of flight is a time difference between emitting the reference signal and receiving the echo signal.

In a third aspect, embodiments of this application provide a time of flight measurement circuit, where the circuit includes:
  N delay units, X time counting units, X delay latching units, a multi-phase clock unit, and a time calculating unit;
  the N delay units are connected in sequence, each delay latching unit is connected to each delay unit in the N delay units, each time counting unit is correspondingly connected to each delay latching unit, the multi-phase clock unit is connected to each time counting unit and each delay latching unit respectively, and the time calculating unit is connected to each time counting unit;
  the N delay units are configured to perform delay processing on an echo signal to obtain N delayed signals, where delay of each of the N delayed signals is uniformly increased by U, and U is a delay of a delay unit, and U is a natural number greater than 0;
  the multi-phase clock unit is configured to generate X clock signals with different phases, where X is a positive integer greater than or equal to 2;
  the delay latching units is configured to generate a delay latching result based on a corresponding clock signal and a corresponding delayed signal;
  the time counting unit is configured to generate a to-be-processed time of flight based on a delay latching result output by a corresponding delay latching unit and a reference signal; and
  the time calculating unit is configured to determine a target time of flight based on the X to-be-processed time of flights output by the X time counting units, where the target time of flight is a time difference between emitting the reference signal and receiving the echo signal.

In a fourth aspect, embodiments of this application provide another time of flight measurement circuit, where the circuit includes:

X×N delay units, X time counting units, X delay latching units, a multi-phase delay unit, and a time calculating unit; the N delay units form a group of delay units;

the multi-phase delay unit is connected to each group of the delay units, each delay latching unit is connected to each delay unit in the N delay units, each time counting unit is correspondingly connected to each delay latching unit, and the time calculating unit is connected to each time counting unit;

the multi-phase delay unit is configured to perform multi-phase delay processing on an echo signal to obtain X to-be-inputted signals with different phases, where X is a positive integer greater than or equal to 2;

each group of the delay units is configured to perform delay processing on each to-be-inputted signal, to obtain N delayed signals corresponding to each to-be-inputted signal, where delay of the N delayed signals is uniformly increased by U, each N delayed signals form a group of delayed signals, and U is a delay of a delay unit, and U is a natural number greater than 0;

the delay latching unit is configured to generate a delay latching result based on clock signal and corresponding N delayed signals;

the time counting unit is configured to generate a to-be-processed time of flight based on the delay latching result output by a corresponding delay latching unit and a reference signal; and the time calculating unit is configured to determine a target time of flight based on X to-be-processed time of flights output by the X time counting units, where the target time of flight is a time difference between emitting the reference signal and receiving the echo signal.

In a fifth aspect, embodiments of this application provide a time of flight measurement apparatus, where the apparatus includes:

a delay processing module, configured to perform delay processing on an echo signal to obtain N delayed signals, where delay of each of the N delayed signals is uniformly increased by U, and U is a delay of a delay unit, and U is a natural number greater than 0;

a clock signal module, configured to generate X clock signals with different phases based on a multi-phase clock unit, where X is a positive integer greater than or equal to 2;

a delay latching module, configured to perform delay latching on the N delayed signals based on each clock signal separately, to generate X delay latching results;

a to-be-processed time of flight module, configured to determine X to-be-processed time of flights corresponding to each delay latching result based on a combination of a reference signal and each delay latching result; and a target time of flight module, configured to determine a target time of flight based on the X to-be-processed time of flights, where the target time of flight is a time difference between emitting the reference signal and receiving the echo signal.

In a sixth aspect, embodiments of this application provide another time of flight measurement apparatus, where the apparatus includes:

a multi-phase delay module, configured to perform multi-phase delay processing on an echo signal to obtain X to-be-inputted signals with different phases, where X is a positive integer greater than or equal to 2;

a delay processing module, configured to perform delay processing on the X to-be-inputted signals with different phases separately, to obtain N delayed signals corresponding to each to-be-inputted signal, where delay of each of the N delayed signals is uniformly increased by U, each N delayed signals form a group of delayed signals, and U is a delay of a delay unit, and U is a natural number greater than 0;

a delay latching module, configured to perform delay latching on each group of the N delayed signals based on each clock signal separately, to generate X delay latching results;

a to-be-processed time of flight module, configured to determine X to-be-processed time of flights corresponding to each delay latching result based on a combination of a reference signal and the delay latching result; and a target time of flight module, configured to determine a target time of flight based on the X to-be-processed time of flights, where the target time of flight is a time difference between emitting the reference signal and receiving the echo signal.

In a seventh aspect, embodiments of this application provide a computer storage medium, where the computer storage medium stores multiple instructions, and the instructions are executed by a processor to load and execute the method steps.

In an eighth aspect, embodiments of this application provide an electronic device, where the electronic device includes a processor and a memory, and the memory stores a computer program, where the computer program is executed by the processor to load and execute the method steps.

This application generates, by using a multi-phase clock unit, a plurality of clock signals with different phases; generates, based on a plurality of corresponding groups of delay signals, a plurality of to-be-processed flight times, and processes the to-be-processed flight times to obtain the target flight time of the echo signal. Multi-phase delay is performed on the echo signal by using a multi-phase delay unit, obtains a plurality of to-be-input signals with different phases, generates a plurality of to-be-processed flight times based on the plurality of corresponding clock signals, and processes the to-be-processed flight times to obtain the target flight time of the echo signal, which is different from a method for generating the flight time by using one clock signal and one group of delay signals. Hence, effectively improves measurement accuracy of time, and greatly reduces costs of a high-precision TDC chip circuit, fewer logic resources is used, practicality and universality of the high-precision TDC chip circuit are improved.

BRIEF DESCRIPTION OF THE DRAWINGS

To describe the technical solutions in the embodiments of this application more clearly, a brief description of the drawings required in the embodiments or the related art is provided below.

DETAILED DESCRIPTION

The following describes the embodiments of this application in detail with reference to the drawings in the embodiments of this application. It should be understood that the described embodiments are only some embodiments of this application, rather than all embodiments.

The terms "first", "second", and the like are only used for the purpose of description, and cannot be understood as an indication or implication of relative importance. Unless otherwise clearly specified and limited, "including" and "having" and any deformation thereof are intended to cover non-exclusive inclusion. For example, a process, a method, a system, a product, or an apparatus including a series of steps or units is not limited to the listed steps or units, but may further includes unlisted steps or units, or further includes other inherent steps or units of the process, the method, the product, or the apparatus. Unless otherwise specified, "multiple" means two or more. "And/or" describes an association relationship of related objects, indicating that three relationships can exist. For example, A and/or B can indicate that A exists alone, A and B exist at the same time, and B exists alone. The character "/" generally indicates that the related objects before and after are in an "or" relationship.

Figure 1:
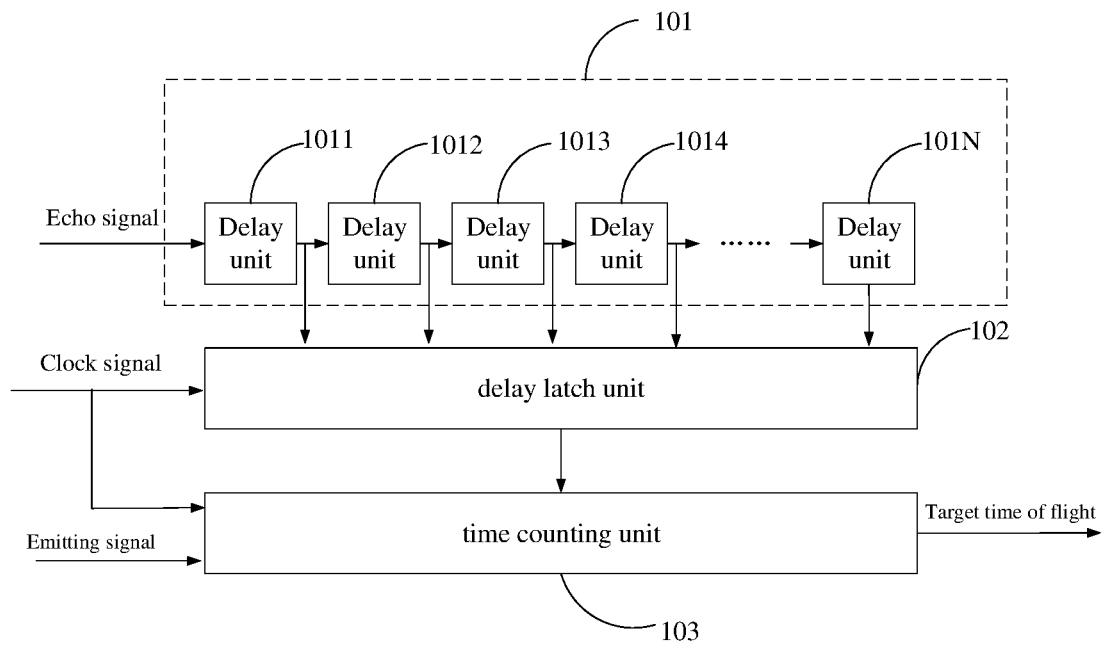
FIG. 1 is a schematic structural diagram of a time of flight measurement circuit in an example.

In an example, as shown in FIG. 1, FIG. 1 is a schematic structural diagram of a time of flight measurement circuit. The time of flight measurement circuit includes: a group of delay units 101. a delay latch unit 102, and a time counting unit 103. The group of delay units 101 includes a delay unit 1011, a delay unit 1012, a delay unit 1013, a delay unit 1014, . . . , a delay unit 101N. In other words, the group of delay units 101 includes N delay units. Each delay unit 101 in the group of delay units 101 is connected in sequence. Each delay unit 101 is connected to the delay latch unit 102. The delay latch unit 102 is connected to the time counting unit 103.

In an embodiment, the time of flight measurement circuit shown in FIG. 1 and the time of flight measurement circuits described below are connected based on an on-chip bus structure. In an example, the time of flight measurement circuit is connected based on an Advanced Peripheral Bus (APB). The APB is one of bus structures based on an Advanced Microcontroller Bus Architecture (AMBA), and has advantages of high standardization and good stability.

Figure 2:
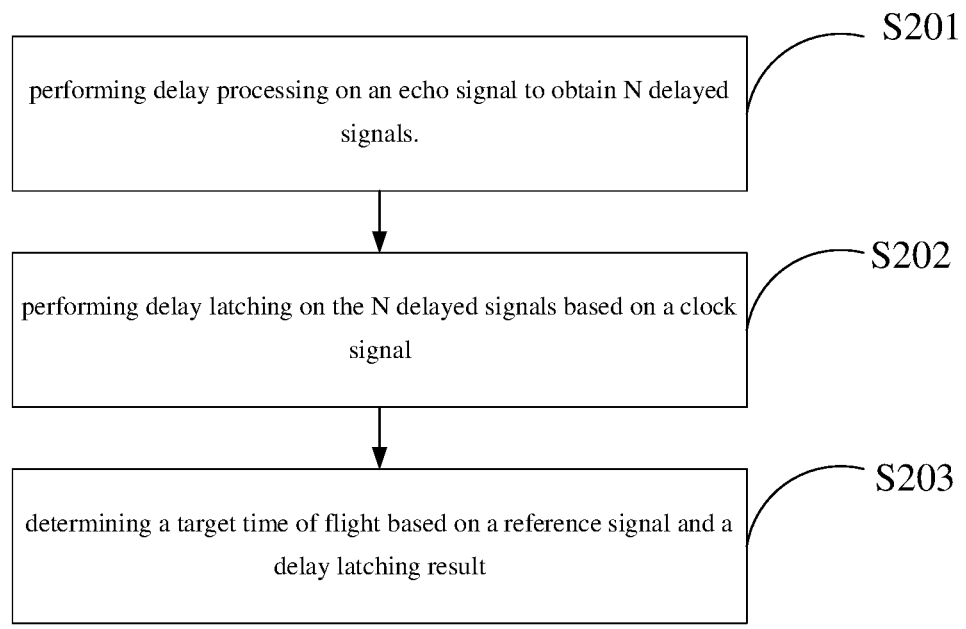
FIG. 2 is a flowchart of a time of flight measurement method according to an embodiment.

FIG. 2 is a flowchart of a principle of time of flight measurement according to an example. The flowchart is applicable to a time of flight measurement circuit shown in FIG. 1. Taking an example that the time of flight measurement circuit is used in a laser ranging field, the flowchart includes the following steps:

S201: performing delay processing on an echo signal to obtain N delayed signals.

A laser signal is emitted from an emitting unit of a target device to a to-be-detected object, and a start signal is emitted to a time counting unit 103, the start signal is a reference signal shown in FIG. 1. The time counting unit 103 starts counting based on a clock signal with a period of T after receiving the reference signal. The count is increased by 1 for each received clock signal; an echo signal reflected by the to-be-detected object is received by a receiving unit of the target device, and the processed echo signal is sent to a group of delay units 101. The echo signal may refer to a laser echo signal reflected by the to-be-detected object, an infrared echo signal reflected by the to-be-detected object, or an ultrasonic echo signal reflected by the to-be-detected object. The to-be-detected object may refer to a target object that generates the echo signal. For example, in the field of LiDAR, the to-be-detected object is a vehicle or a tree on a street; in the field of medical examination, the to-be-detected object is a human body tissue; or in the field of ultrasonic detection, the to-be-detected object is a piece of metal.

The group of delay units 101 performs delay processing on the echo signal to obtain N delayed signals. Delay of each of the N delayed signals is uniformly increased by U. In other words, the delay unit 101 has a delay of U. The echo signal outputs a delayed signal with a time difference of U after passing through the first delay unit. The first delay unit sends the delayed signal to the second delay unit, so that the second delay unit delays the delayed signal and then outputs a delayed signal with a time difference of 2U. N delay units delay the echo signal to obtain N delayed signals. Delay of each of the N delayed signals is uniformly increased by U. The delay is the above time difference.

S202: performing delay latching on the N delayed signals based on a clock signal.

The delay unit 101 sends the N delayed signals to the delay latching unit 102. The delay latching unit 102 performs delay latching on the N delayed signals.

S203: determining a target time of flight based on a reference signal and a delay latching result.

The delay latch unit 102 receives a clock signal and N delay signals to perform delay and latch, and compares rising edges of a $G^{th}$ delay signal of the N delay signals to the rising edge of the clock signal, to align the rising edge of the $G^{th}$ delay signal with the rising edge of the clock signal, the rising edge trigger method is used to obtain the $G^{th}$ delay signal as a target delay signal. The target delay signal is a result of delay and latch of the delay latch unit 102. Based on the $G^{th}$ delay signal and a count H of the time counting unit 103, in this embodiment, when the time counting unit receives one clock signal, the count is increased by one, and the target flight time of the echo signal is calculated based on the formula T×H−G×U, and the target flight time is output.

In the field of laser ranging, a processing unit connected to the time of flight measurement circuit can obtain a distance between the to-be-detected object and the target device, based on the target time of flight multiplied by the speed of the laser signal.

In some examples, the target delayed signal is obtained based on the rising edge trigger method. When the delay of the delay unit is large, for example, the delay can only reach ⅓ of the period of the clock signal. Therefore, only three delay units can be arranged. In addition, the rising edge of the three delayed signals are compared with the rising edge of the clock signal. In this case, the rising edge of any delayed signal cannot completely coincide with the rising edge of the clock signal. Therefore, only the delayed signal closest to the clock signal is taken as the target signal. Therefore, the part of the time that cannot be completely coincided is ignored, and the time measurement precision is greatly reduced.

The time resolution of the time of flight measurement circuit depends on the delay of the delay unit. For example, the delay of the delay unit is 20 ps, and there are 10 delay units. In this case, the period of the clock unit is 200 ps, and the time resolution is 20 ps. When the delay of the delay unit is 10 ps, the time resolution of the time of flight measurement circuit is 10 ps.

High-precision delay units inevitably have high requirements for the manufacturing process and the working environment of the delay unit. High-precision delay units correspond to high cost and a stable working environment. This undoubtedly greatly reduces the practicality and universality of the high-precision time of flight measurement circuit. Embodiments of this application provide a time of flight measurement method and circuit, which can effectively improve the precision of measuring the time of flight of an echo signal while saving cost and simplifying calculation.

Figure 3:
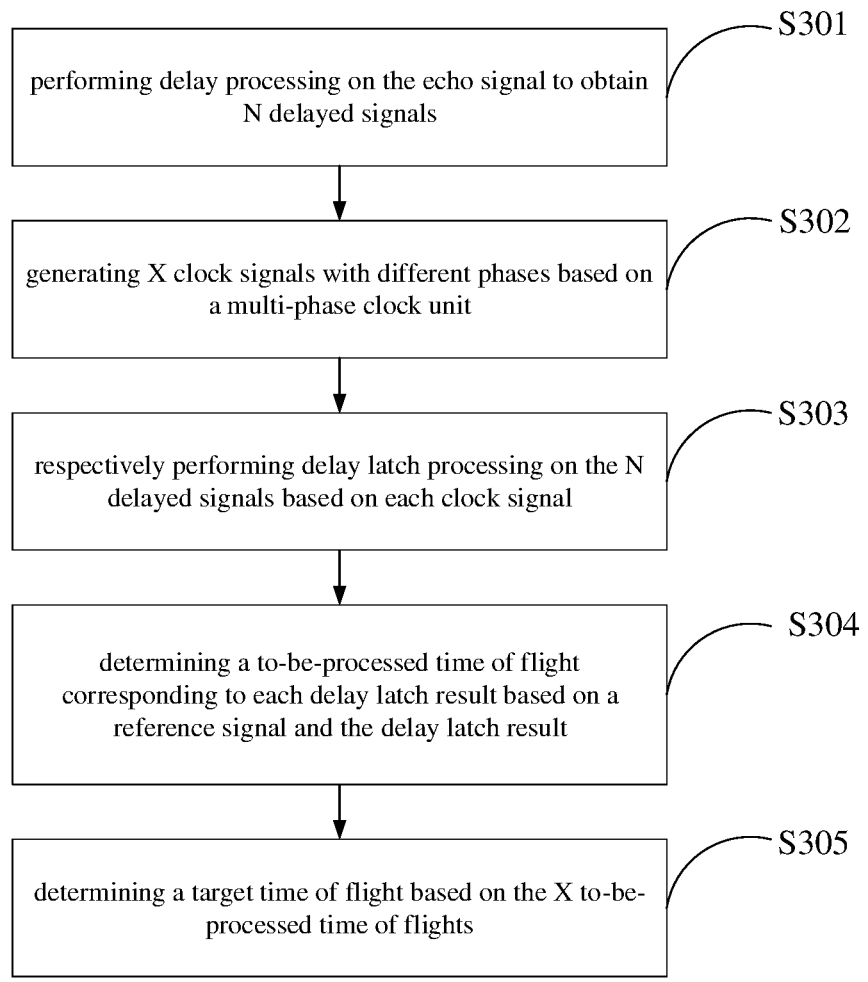
FIG. 3 is a flowchart of a time of flight measurement method according to an embodiment.

FIG. 3 is a flowchart of a time of flight measurement method according to an embodiment. The time of flight measurement method includes the following steps:

S301: performing delay processing on the echo signal to obtain N delayed signals.

A delay of the N delayed signals is uniformly increased by U. The delay U is a delay of a delay unit. The U is a natural number greater than 0.

S302: generating X clock signals with different phases based on a multi-phase clock unit.

The X is a positive integer greater than or equal to 2. The X clock signals with different phases can be understood as the clock signals with the same period T but different start time of emission. In this embodiment, a phase difference between the X clock signals is uniformly increased by U/X. A phase difference between the first clock signal and the $X^{th}$ clock signal is a delay of the delay unit.

In an example, if the delay is 20 ps, a time difference between the first delayed signal in the N delayed signals and the second delayed signal in the N delayed signals received by the delay latch unit is 20 ps. The delay of the N delayed signals is uniformly increased by 20 ps. A period of the clock signal is 20×N ps. N is the number of delay units. For example, if there are N=10 delay units, a period of the clock signal is 200 ps. A phase difference between the X clock signals is uniformly increased by 200 ps/X.

S303: respectively performing delay latch processing on the N delayed signals based on each clock signal.

X delay latch results are generated. There are X delay latch units and X groups of delayed signals. Each delay latch unit receives one group of delayed signals and one clock signal. One group of delayed signals includes N delayed signals. Each of the X time counting units corresponds to each of the X delay latch units. Each time counting unit performs counting based on the clock signal with the period T.

S304: determining a to-be-processed time of flight corresponding to each delay latch result based on a reference signal and the delay latch result.

The to-be-processed time of flight includes X time of flights. The to-be-processed time of flight can be understood as the target time of flight shown in FIG. 1. For a detailed process of determining the corresponding to-be-processed time of flight based on one group of N delayed signals, one clock signal, one delay latch unit, and one time counting unit, refer to step S203 in FIG. 2. The delay latch unit receives a first clock signal and the N delayed signals for delay latch. Then based on the $G^{th}$ delay signal and the counting result H of the time counting unit, calculate a time of flight of the echo signal based on the following calculation formula: $T \times H - G \times U$.

Therefore, the corresponding X to-be-processed time of flights are determined based on the X groups of delayed signals, the X clock signals, the X delay latch units, and the X time counting units.

S305: determining a target time of flight based on the X to-be-processed time of flights.

The target time of flight is a time difference between the emission reference signal and the received echo signal, that is, the time of flight of the echo signal. In an embodiment, the phase difference between the clock signals is uniformly increased by U/X, the step of determining the target time of flight based on the X to-be-processed time of flights is: averaging the X to-be-processed time of flights and then determining the target time of flight. Averaging can be understood as adding the X to-be-processed time of flights and then dividing the sum by X.

In an embodiment, assuming that X=2, there are two groups of delayed signals, two clock signals, two delay latch units, and two time counting units. The first group of delayed signals corresponds to the first clock signal, the first delay latch unit, and the first time counting unit. The second group of delayed signals corresponds to the second clock signal, the second delay latch unit, and the second time counting unit. A period of the clock signal is T. A delay of the delay unit is t, t=U. A phase of the first clock signal is 0. A phase difference between the second clock signal and the first clock signal is t/2. Based on the time of flight measurement method shown in FIG. 2, the time resolution is the delay t.

Assuming that a first to-be-processed time of flight corresponding to the first group of delayed signals, the first clock signal, the first delay latch unit, and the first time counting unit is $H \times T - G \times t$, where H indicates that a target delayed signal is aligned with $H^{th}$ clock signal in the first clock signal, and G indicates that a target delay unit is the $G^{th}$ delayed signal in the N delayed signals. Based on t=T/H, the first to-be-processed time of flight is $M \times t$.

As the phase difference between the second clock signal and the first clock signal is t/2, the first to-be-processed time of flight corresponding to the second group of delayed signals, the second clock signal, the second delay latch unit, and the second time counting unit is $(M+1) \times t$ or $M \times t$. $(M+1) \times t$, the G+1th delayed signal is aligned with the $H^{th}$ clock signal. $M \times t$ can be understood as that the $G^{th}$ delayed signal is aligned with the $H^{th}$ clock signal.

After averaging the first to-be-processed time of flight and the second to-be-processed time of flight, the target time of flight may be $M \times t$ or $(M+0.5) \times t$. $(M+0.5) \times t$ is $(2M+1) \times t1$, where t1=2t.

Therefore, the time resolution is changed from t to t/2, the time resolution is improved by 2 times.

For the time of flight measurement method shown in FIG. 3 which including X clock signals, the time resolution is improved by X times.

Multiple clock signals with different phases are generated by the multi-phase clock unit. Multiple to-be-processed time of flights are generated based on corresponding multiple groups of delayed signals, the to-be-processed time of flight is processed to obtain the target time of flight of the echo signal. The time of flight is generated based on one clock signal and one group of delayed signals. This solution solves the problem that the resolution of the TDC is limited by the delay of the delay unit, effectively improves the accuracy of time measurement, and significantly reduces the cost of the high-precision TDC chip circuit. In addition, the solution occupies fewer logic resources, thereby improving the practicality and universality of the high-precision TDC chip circuit.

Figure 4:
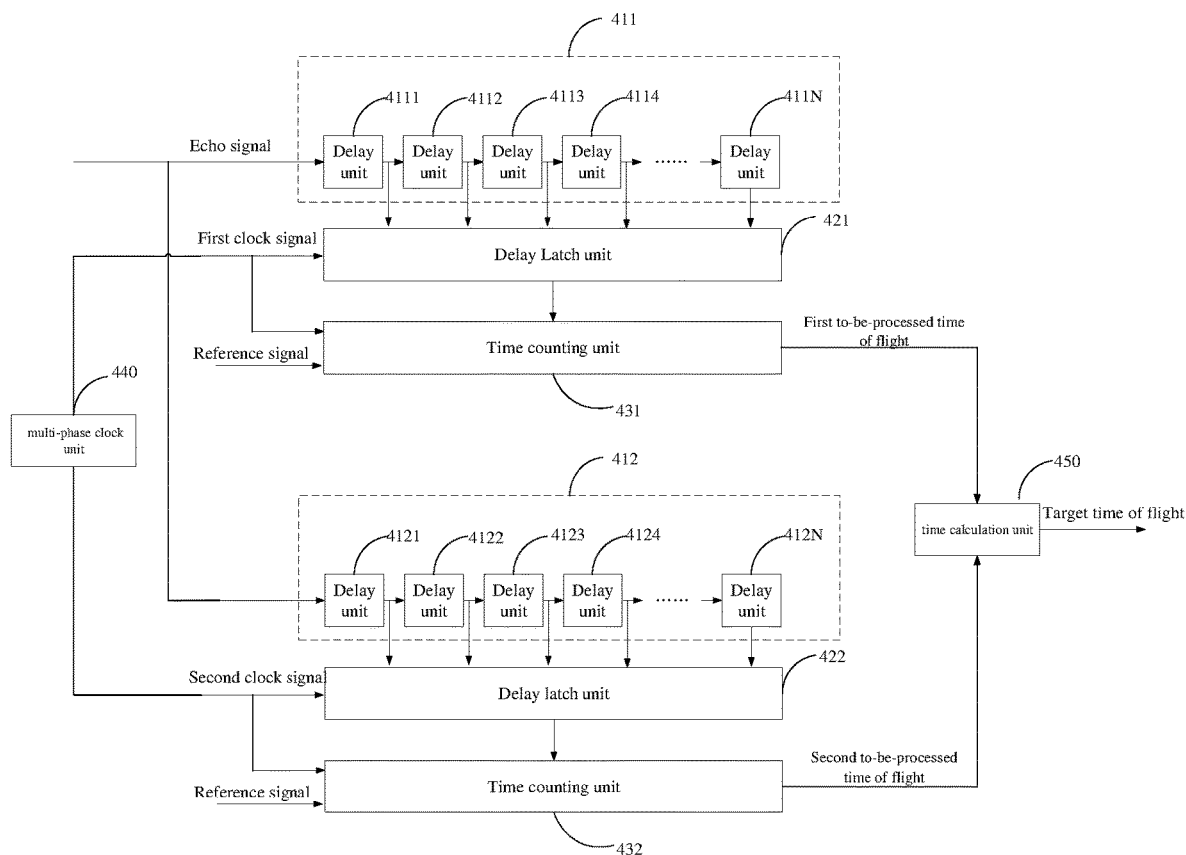
FIG. 4 is a schematic structural diagram of a time of flight measurement circuit according to an embodiment.

As shown in FIG. 4, in an embodiment, provides a time of flight measurement circuit, which is applicable to the time of flight measurement method shown in FIG. 3. The time of flight measurement circuit includes X×N delay units, X delay latch units, X time counting units, a multi-phase clock unit 440, and a time calculation unit 450. The time of flight measurement circuit shown in FIG. 4 is a part of the structure of the time of flight measurement circuit, and is schematic.

The N delay units form one group of delay units. As shown in FIG. 4, one group of delay units 411 includes delay units 4111, delay units 4112, delay units 4113, . . . , delay units 411N. Another group of delay units 412 includes delay units 4121, delay units 4122, . . . , delay units 412N. The time of flight measurement circuit further includes the $X^{th}$ group of delay units 41X (not shown in the figure), X delay latch units include a delay latch unit 421 and a delay latch unit 422, and X time counting units include a time counting unit 431 and a time counting unit 432.

As shown in FIG. 4, the N delay units in one group of delay units 411 are connected in sequence. Each delay latch unit is connected to each delay unit in the N delay units. Each time counting unit is connected to each delay latch unit. The multi-phase clock unit is connected to each time counting unit and each delay latch unit. The time calculation unit is connected to each time counting unit.

One group of delay units is configured to perform delay processing on the echo signal to obtain N delayed signals. A delay of the N delayed signals is uniformly increased by U. The U is a delay of a delay unit. The U is a natural number greater than 0. For example, one group of delay units 411 generates N delayed signals based on the echo signal, and the another group of delay units 412 generates N delayed signals based on the echo signal. For processing of the one group of delay units generating the N delayed signals, refer to the above step S203 shown in FIG. 2.

The multi-phase clock unit 440 is configured to generate X clock signals with different phases. X is a positive integer greater than or equal to 2. A phase difference between the X clock signals is uniformly increased by U/X. The X clock signals with different phases are sent to the corresponding delay latch units and time counting units. For example, the clock signal includes a first clock signal and a second clock signal. The first clock signal is sent to the delay latch unit 421 and the time counting unit 431. The second clock signal is sent to the delay latch unit 422 and the time counting unit 432. A phase difference between the first clock signal and the second clock signal is U/X.

The delay latch unit is configured to generate a delay latch result based on a corresponding clock signal and a corresponding N delayed signals. The delay latch unit 421 generates a first delay latch result based on the first clock signal and the one group of delay units 411 generating the N delayed signals. The delay latch unit 422 generates a second delay latch result based on the second clock signal and the another group of delay units 412 generating the N delayed signals.

The time counting unit is configured to generate the to-be-processed time of flight based on the delay latch result output by the corresponding delay latch unit and the reference signal. The number of the to-be-processed time of flight is X. For example, the time counting unit 431 generates a first to-be-processed time of flight based on the result output by the delay latch unit 421 and the reference signal. The time counting unit 432 generates a second to-be-processed time of flight based on the result output by the delay latch unit 422 and the reference signal.

The time calculation unit 450 is configured to average the X to-be-processed time of flights based on the X time counting units, and then determine the target time of flight. The X to-be-processed time of flights include the first to-be-processed time of flight and the second to-be-processed time of flight shown in FIG. 4.

For steps of completing the time of flight measurement in the above time of flight measurement circuit, refer to the time of flight measurement method shown in FIG. 3.

Multiple clock signals with different phases are generated by the multi-phase clock unit. Multiple to-be-processed time of flights are generated based on corresponding multiple groups of delayed signals. The to-be-processed time of flight is processed to obtain the target time of flight of the echo signal. The time of flight is generated based on one clock signal and one group of delayed signals. This solution solves the problem that the resolution of the TDC is limited by the delay of the delay unit, effectively improves the accuracy of time measurement, and significantly reduces the cost of the high-precision TDC chip circuit. In addition, the solution occupies fewer logic resources, thereby improving the practicality and universality of the high-precision TDC chip circuit.

Figure 5:
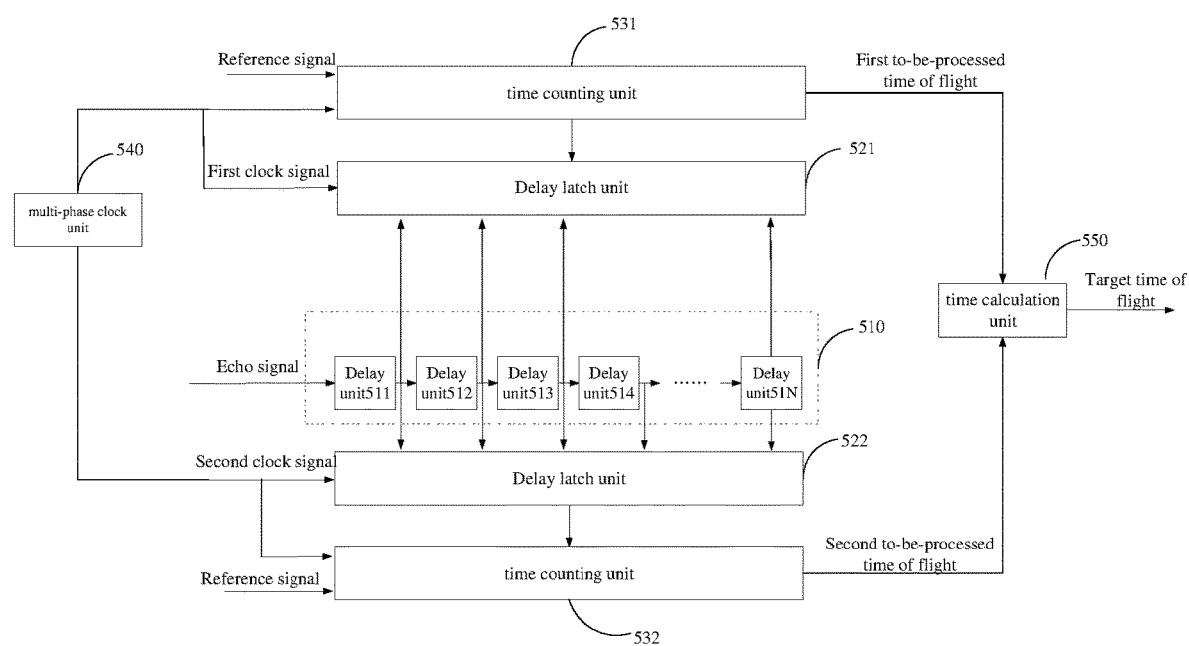
FIG. 5 is a schematic structural diagram of another time of flight measurement circuit according to an embodiment.

As shown in FIG. 5, in an embodiment, another time of flight measurement circuit is provided, which is applicable to the time of flight measurement method shown in FIG. 3. The time of flight measurement circuit shown in FIG. 5 includes one group of delay units 510, X delay latch units, X time counting units, a time calculation unit 550, and a multi-phase clock unit 540. The time of flight measurement circuit shown in FIG. 5 is a part of the structure of the time of flight measurement circuit.

One group of delay units 510 includes delay units 511, delay units 512, delay units 513, . . . , delay units 51N. The X delay latch units include a delay latch unit 521, a delay latch unit 522, . . . , a delay latch unit 52X (not shown in the figure). The X time counting units include a time counting unit 531, a time counting unit 532, . . . , a time counting unit 53X (not shown in the figure).

As shown in FIG. 5, the N delay units in the one group of delay units 510 are connected in sequence. Each delay latch unit is connected to each delay unit in the N delay units. Each time counting unit is connected to each delay latch unit. The multi-phase clock unit is connected to each time counting unit and each delay latch unit. The time calculation unit is connected to each time counting unit.

The time of flight measurement circuit shown in FIG. 5 includes one group of delay units 510. The N delayed signals are generated by one group of delay units 510, and one group of delay units 510 generates X groups of delayed signals. Each group of delayed signals includes N delayed signals. Therefore, the time of flight measurement circuit shown in FIG. 5 reduces (X−1) groups of delay units, further reducing the cost of the high-precision time of flight measurement circuit.

N delay units are configured to perform delay processing on the echo signal to obtain X groups of delayed signals.

Each group of delayed signals includes N delayed signals. The X groups of delayed signals are sent to the corresponding X delay latch units. A delay of the N delayed signals is uniformly increased by U. The U is a delay of a delay unit. The U is a natural number greater than 0.

For steps of completing the time of flight measurement in the above time of flight measurement circuit, refer to the time of flight measurement method shown in FIG. 3 and the time of flight measurement circuit shown in FIG. 4.

This embodiment uses N delay units instead of X×N delay units to generate X groups of delayed signals. On the premise of the same implementation of high-precision time of flight measurement, the cost of the high-precision TDC chip circuit is significantly reduced, and the error caused by the phase difference between multiple groups of delay units due to environmental factors such as quantization error and signal jitter during the operation is avoided, thereby effectively improving the operating stability and reliability of the time of flight measurement circuit.

In an embodiment, multiple clock signals with different phases are generated by the multi-phase clock unit. Multiple to-be-processed time of flights are generated based on corresponding multiple groups of delayed signals. The to-be-processed time of flight is processed to obtain the target time of flight of the echo signal. The time of flight is generated based on one clock signal and one group of delayed signals. This solution solves the problem that the resolution of the TDC is limited by the delay of the delay unit, effectively improves the accuracy of time measurement, and significantly reduces the cost of the high-precision TDC chip circuit. In addition, the solution occupies fewer logic resources, thereby improving the practicality and universality of the high-precision TDC chip circuit.

Based on the time of flight measurement method shown in FIG. 3, the phase difference between the clock signals is uniformly increased by U/X, the phase difference between two adjacent emitted clock signals is 1/X of the delay of the delay unit. The time of flight measurement method can reduce the precision requirement and cost of the multi-phase clock unit, and further improve the universality of the time of flight measurement circuit in this application.

Figure 6:
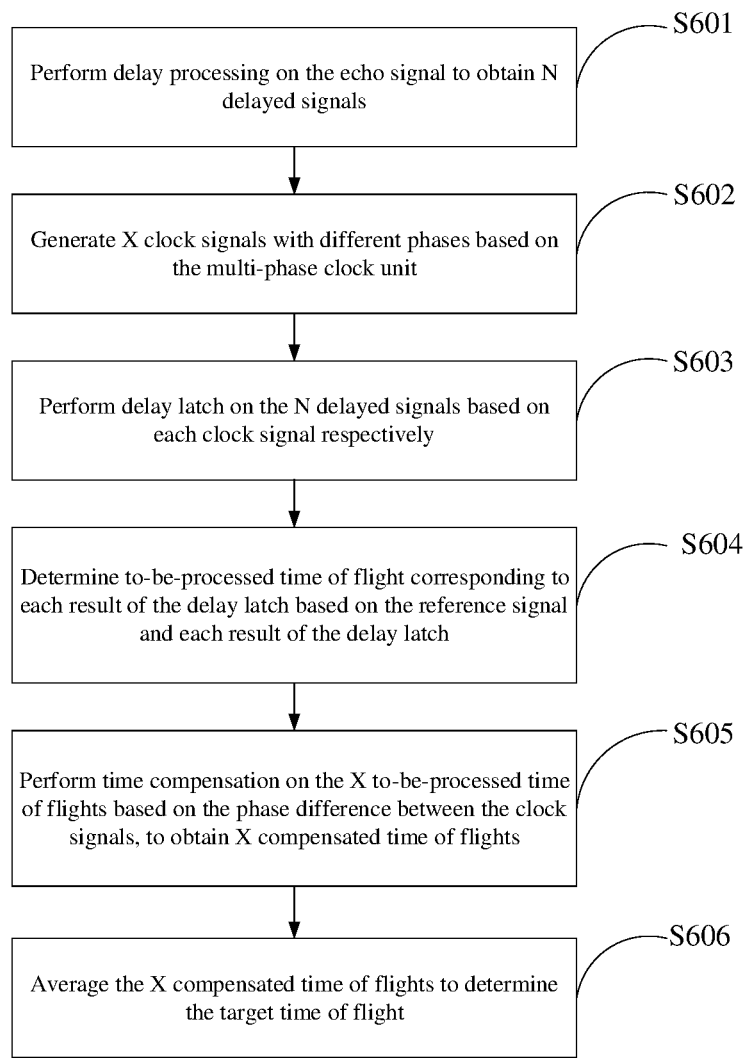
FIG. 6 is a flowchart of another time of flight measurement method according to an embodiment.

In an embodiment, as shown in FIG. 6, another time of flight measurement method is provided. The time of flight measurement method includes the following steps:

S601: Perform delay processing on the echo signal to obtain N delayed signals.

A delay of the N delayed signals is uniformly increased by U, the U is a delay of a delay unit, U is a natural number greater than 0.

S602: Generate X clock signals with different phases based on the multi-phase clock unit.

The X is a positive integer greater than or equal to 2. X clock signals with different phases can be understood as clock signals with period T but different starting times of transmission. In an embodiment, the phase difference between the X clock signals is uniformly increased by Y The Y is greater than U/X.

For example, the delay of the delay unit is 20 ps, X=2. Then, the phase difference between the two clock signals is greater than 10 ps. For example, the phase difference is 20 ps, 50 ps, and the like.

S603: Perform delay latch on the N delayed signals based on each clock signal respectively.

The results of the delay latch include X results. There are X delay latch units and X groups of delayed signals. Each delay latch unit receives one group of delayed signals and one clock signal. Each group of delayed signals includes N delayed signals. There is no difference between one group of delayed signals and another group of delayed signals. Each of the X time counting units corresponds to each of the X delay latch units. Each time counting unit counts based on the clock signal with the period T.

S604: Determine to-be-processed time of flight corresponding to each result of the delay latch based on the reference signal and each result of the delay latch.

The process of determining the to-be-processed time of flight corresponding to each result of the delay latch based on the reference signal and each result of the delay latch is shown in the time of flight measurement method in FIG. 1 and the time of flight measurement method shown in FIG. 3.

S605: Perform time compensation on the X to-be-processed time of flights based on the phase difference between the clock signals, to obtain X compensated time of flights.

Step S602 show that the phase difference among the X clock signals is uniformly increased by Y Therefore, the time compensation amount is ΔT=Y−U/X. Perform compensation on the X to-be-processed time of flights based on the time compensation amount ΔT, to obtain the X compensated time of flights.

For example, the delay of the delay unit is 20 ps, and X=5. The phase difference between the 5 clock signals is uniformly increased by 50 ps. Then, the time compensation amount ΔT=Y−U/X is 45 ps. Based on the corresponding 5 time counting units, corresponding 5 clock signals and N delay signals, the 5 flight times to be processed are respectively T1, T2, T3, T4 and T5. Subtract 45 ps from T1, T2, T3, T4, and T5, respectively, to obtain 5 compensated time of flights.

S606: Average the X compensated time of flights to determine the target time of flight.

The target time of flight is determined by averaging the X compensated time of flights. The averaging formula is (T1+T2+T3+T4+T5+ . . . TN)/X. The target time of flight is the time difference between the emission of the reference signal and the reception of the echo signal, that is, the time of flight of the echo signal.

The time of flight measurement method compensates the to-be-processed time of flight. The time of flight measurement method can reduce the precision requirement and cost of the multi-phase clock unit. On the premise of not reducing the resolution of the TDC chip circuit in measuring time, the universality of the time of flight measurement method in this application is further improved.

Figure 7:
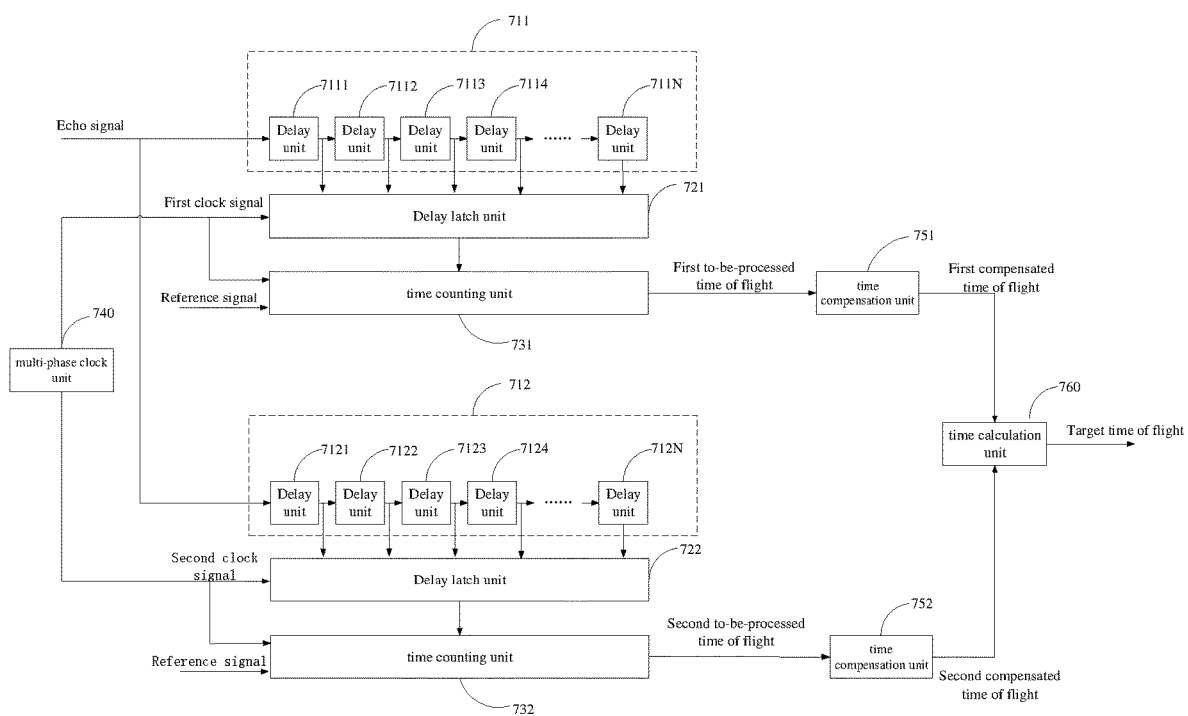
FIG. 7 is a schematic structural diagram of a time of flight measurement circuit according to an embodiment.

As shown in FIG. 7, in an embodiment of the application provides a time of flight measurement circuit, which is applicable to the time of flight measurement method shown in FIG. 6. The time of flight measurement circuit includes X×N delay units, X delay latch units, X time counting units, X time compensation units, a multi-phase clock unit 740, and a time calculation unit 760. The time of flight measurement circuit shown in FIG. 7 is a part of the structure of the time of flight measurement circuit.

The N delay units form one group of delay units. As shown in FIG. 7, one group of delay units 711 includes delay units 7111, delay units 7112, delay units 7113, . . . , delay units 711N. Another group of delay units 712 includes delay units 7121, delay units 7122, . . . , delay units 712N. The X delay latch units include a delay latch unit 721 and a delay latch unit 722. The X time counting units include a time counting unit 731 and a time counting unit 732. The X time compensation units include a time compensation unit 751 and a time compensation unit 752.

As shown in FIG. 7, the N delay units in one group of delay units 711 are connected in sequence. Each delay latch unit is connected to each delay unit in the N delay units. Each time counting unit is connected to each delay latch unit. Each time compensation unit is connected to each time counting unit. The multi-phase clock unit is connected to each time counting unit and each delay latch unit. The time calculation unit is connected to each time compensation unit.

In an embodiment, the delay unit, multi-phase clock unit 740, delay latch unit and time counting unit may refer to the above units shown in FIG. 4 above.

The time compensation unit is configured to obtain X compensated time of flights based on Y to-be-processed time of flights. In an embodiment, the phase difference between the X clock signals is uniformly increased by Y The Y is greater than U/X. The time compensation amount ΔT for the X to-be-processed time of flights is Y−U/X. For example, the time compensation unit 751 obtains the first compensated time of flight based on the first to-be-processed time of flight. The time compensation unit 752 obtains the second compensated time of flight based on the second to-be-processed time of flight. The working principle of each time compensation unit performing time compensation on each to-be-processed time of flight is shown in FIG. 6.

In an embodiment, the time compensation unit and the time calculation unit 760 are integrated into the same calculation chip. The X time compensation units are multiple subunits included in the time calculation unit 760. The time calculation unit 760 performs time compensation on the X to-be-processed time of flights based on the X time compensation units. In some embodiments, the X time compensation units are multiple virtual modules included in the time calculation unit 760. The X time compensation units are used to represent that the time calculation unit 760 has a function of performing time compensation on the X to-be-processed time of flights.

The phase difference between the clock signals is uniformly increased by U/X. That is, the phase difference between two adjacent emitted clock signals is 1/X of the delay of the delay unit.

The time calculation unit 760 is configured to determine the target time of flight based on averaging the X compensated time of flights. The X compensated time of flights include the first compensated time of flight and the second compensated time of flight.

For steps of completing the time of flight measurement in the above time of flight measurement circuit, refer to the time of flight measurement method shown in FIG. 6.

The resolution of the TDC is limited by the delay of the delay unit. The accuracy of time measurement is effectively improved, and the cost of the high-precision TDC chip circuit is significantly reduced. In addition, the solution occupies fewer logic resources, thereby improving the practicality and universality of the high-precision TDC chip circuit. The to-be-processed time of flight is compensated. The time of flight measurement circuit can reduce the precision requirement and cost of the multi-phase clock unit. On the premise of not reducing the resolution of the TDC chip circuit in measuring time, the universality and operating reliability of the time of flight measurement circuit in this application are further improved.

Figure 8:
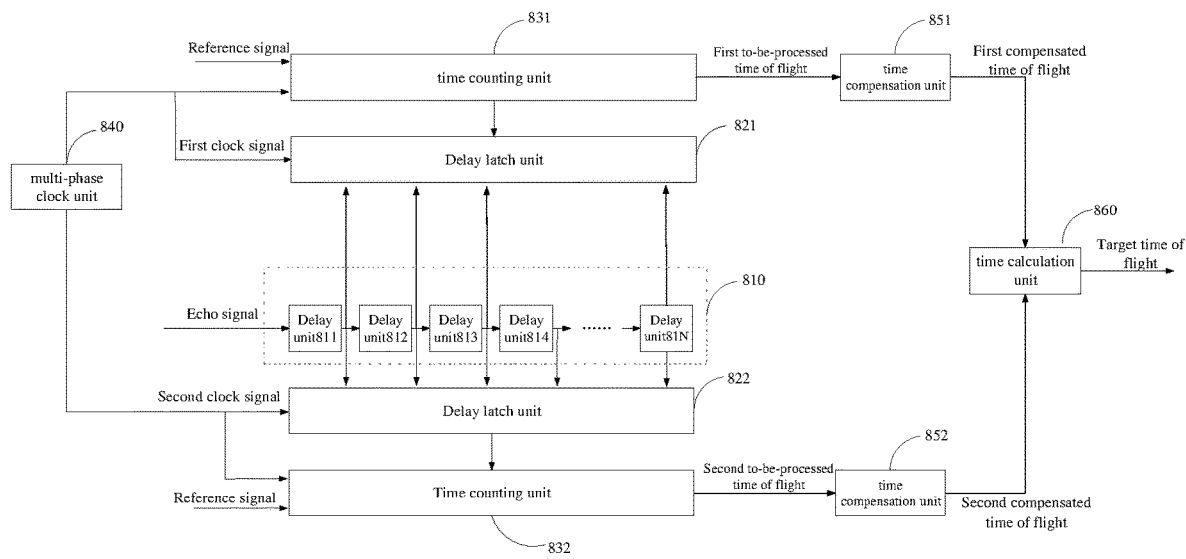
FIG. 8 is a schematic structural diagram of another time of flight measurement circuit according to an embodiment.

As shown in FIG. 8, in an embodiment, another time of flight measurement circuit is provided, which is applicable to the time of flight measurement method shown in FIG. 6. The time of flight measurement circuit shown in FIG. 8 includes one group of delay units 810, X delay latch units, X time counting units, X time compensation units, a multi-phase clock unit 840, and a time calculation unit 860.

One group of delay units 810 includes delay units 811, delay units 812, delay units 813, . . . , delay unit 81N. The X delay latch units include delay latch unit 821, delay latch unit 822 . . . , delay latch unit 82X (not shown in the figure). The X time counting units include time counting unit 831, time counting unit 832 . . . , time counting unis 83X (not shown in the figure).

As shown in FIG. 8, the N delay units in one group of delay units 810 are connected in sequence. Each delay latch unit is connected to each delay unit in the N delay units. Each time counting unit is connected to each delay latch unit. The multi-phase clock unit 840 is connected to each time counting unit and each delay latch unit. The time calculation unit 860 is connected to each time compensation unit.

The time of flight measurement circuit shown in FIG. 8 includes one group of delay units 810. The N delayed signals are generated by one group of delay units 810, and one group of delay units 810 generates X groups of delayed signals. Each group of delayed signals includes N delayed signals.

The N delay units are configured to perform delay processing on the echo signal to obtain X groups of delayed signals. Each group of delayed signals includes N delayed signals. The X groups of delayed signals are sent to the corresponding X delay latch units. The delay of the N delayed signals is uniformly increased by U. The U is a delay of a delay unit. The U is a natural number greater than 0.

The time compensation unit is configured to obtain X compensated time of flights after compensating X to-be-processed time of flights based on Y In an embodiment, the phase difference between the X clock signals is uniformly increased. The Y is greater than U/X. The time compensation amount ΔT for the X to-be-processed time of flights is Y−U/X. For example, the time compensation unit 851 obtains the first compensated time of flight based on the first to-be-processed time of flight. The time compensation unit 852 obtains the second compensated time of flight based on the second to-be-processed time of flight. Each time compensation unit performing time compensation on each to-be-processed time of flight is shown in FIG. 6. The time compensation unit is shown in FIG. 7. The time calculation unit 860 is shown in FIG. 7.

The time calculation unit 860 is configured to determine the target time of flight based on averaging the X compensated time of flights. The X compensated time of flights include the first compensated time of flight and the second compensated time of flight.

For steps of completing the time of flight measurement in the above time of flight measurement circuit, refer to the time of flight measurement method shown in FIG. 6 and the time of flight measurement circuit shown in FIG. 7.

Compared with the time of flight measurement circuit shown in FIG. 7, this embodiment uses N delay units instead of X×N delay units to generate X groups of delayed signals. On the premise of the same implementation of high-precision time of flight measurement, the cost of the high-precision TDC chip circuit is significantly reduced, and the error caused by the phase difference between multiple groups of delay units due to environmental factors such as quantization error and signal jitter during the operation is avoided, thereby effectively improving the operating stability and reliability of the time of flight measurement circuit. The to-be-processed time of flight is compensated. The time of flight measurement circuit can reduce the precision requirement and cost of the multi-phase clock unit. On the premise of not reducing the resolution of the TDC chip circuit in measuring time, the universality and operating reliability of the time of flight measurement circuit in this application are further improved.

In an embodiment, the time of flight measurement circuit further includes a delay line phase-locked oscillator. The multi-phase clock unit is connected to the N delay units through the delay line phase-locked oscillator. The delay-locked oscillator adjusts the oscillation period of the N delay units or the X×N delay units by feedback controlling the voltage of the TDC chip circuit, so that the oscillation period is stable on the period of the clock signal, thereby stabilizing the overall delay of the X groups of delay units of the high-precision TDC chip circuit in real time. When the frequency of the delay unit changes due to factors such as the external temperature and the power supply voltage, the loop filter of the delay line phase-locked oscillator controls the voltage of the TDC chip circuit, and detects the frequency of the delay unit through the feedback loop, until the frequency of the delay unit is restored to 1/N of the frequency of the clock signal.

The delay line phase-locked oscillator is used to eliminate the frequency change of the delay unit caused by factors such as the external temperature and the power supply voltage, and stabilize the frequency of the delay unit in the high-precision TDC chip circuit in real time, thereby improving the reliability of the TDC chip circuit.

Embodiments of this application effectively improves the accuracy of time measurement, and greatly reduces the cost of high precision TDC chip circuit, and consumes less logic resources, so as to improve the practicality and universality of high precision TDC chip circuit. By compensating the processing time of flight, the time of flight measurement circuit can reduce the precision requirement and cost of the multi-phase clock unit, and further improve the universality and reliability of the applied time of flight measurement circuit without reducing the resolution of the TDC chip circuit.

Figure 9:
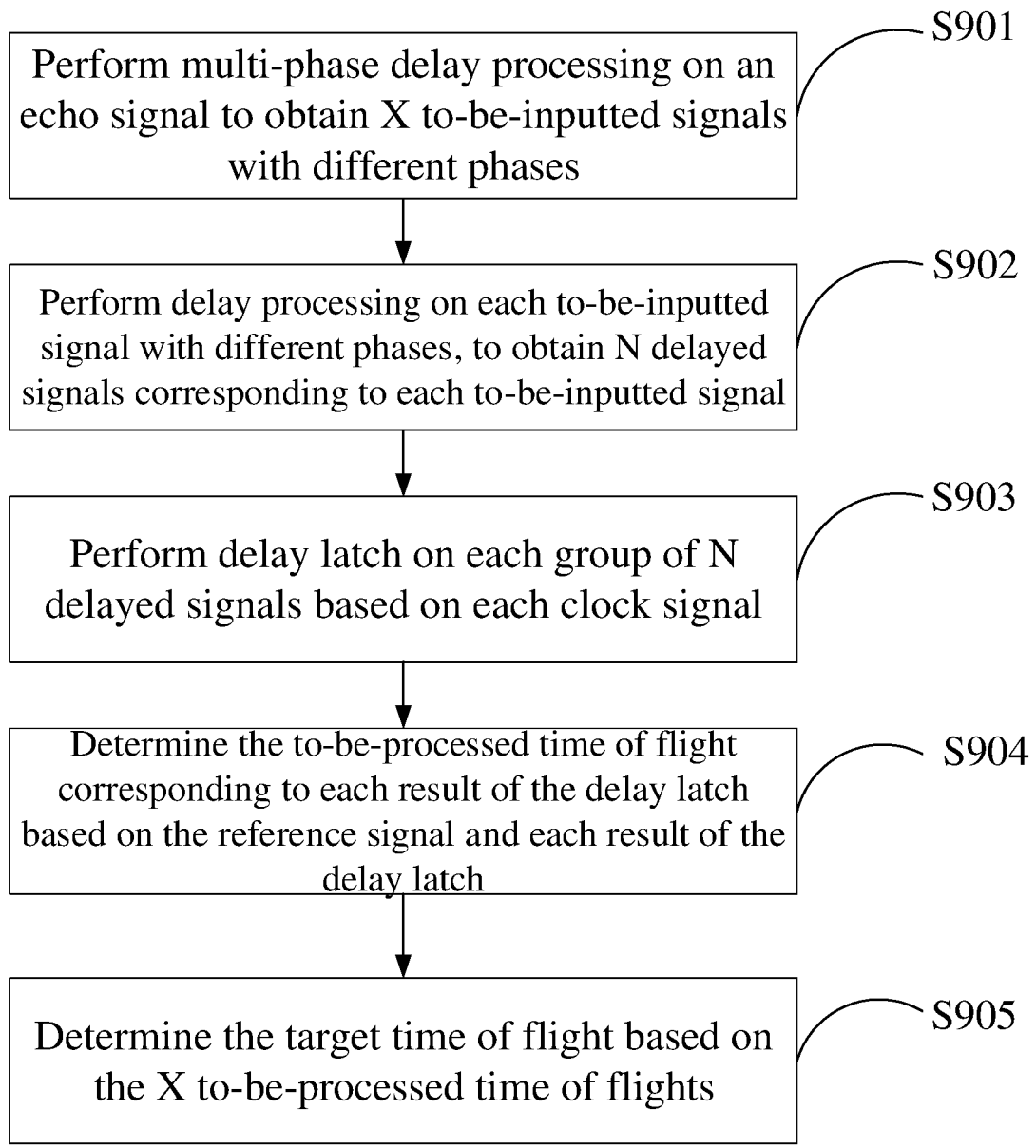
FIG. 9 is a schematic structural diagram of a time of flight measurement apparatus according to an embodiment.

In an embodiment, as shown in FIG. 9, this embodiment provides a time of flight measurement method. The method includes the following steps:

S901: Perform multi-phase delay processing on an echo signal to obtain X to-be-inputted signals with different phases.

The period of the clock signal is T. The delay of the delay unit is U. The X is a positive integer greater than or equal to 2. The phase difference among the X input signals is uniformly increased by U/X. In other words, the phase difference between the first input signal and the $X^{th}$ input signal is the delay of the delay unit.

In an embodiment, the echo signal is delayed in multiple phases by the multi-phase delay unit to, output X to-be-inputted signals with different phases.

S902: Perform delay processing on each to-be-inputted signal with different phases, to obtain N delayed signals corresponding to each to-be-inputted signal.

The delay of the N delayed signals is uniformly increased by U. Each N delayed signals form one group of delayed signals. The N is a positive integer greater than or equal to 2. One to-be-inputted signal is delayed N times to obtain one group of delayed signals. The delay of the group of delayed signals is uniformly increased by U. The phase difference among the X groups of input signals and the X groups of delayed signals is uniformly increased by U/X.

S903: Perform delay latch on each group of N delayed signals based on each clock signal.

The results of the delay latch include X results. One clock unit generates X clock signals. The period of the clock signal is T. Based on one clock signal, N delayed signals are delayed and latched. Based on X clock signals, each group of N delayed signals is delayed and latched. The delay latch on N delay latch units based on one clock signal is shown in FIG. 2 or FIG. 3.

S904: Determine the to-be-processed time of flight corresponding to each result of the delay latch based on the reference signal and each result of the delay latch.

The to-be-processed time of flight includes X to-be-processed time of flights.

The to-be-processed time of flight can be understood as the target flight time as shown in FIG. 1. The detailed process of determining the corresponding to-be-processed time of flight based on a group of N delay signals, a clock signal, a delay lock unit and a time counting unit is referred to step S204 in FIG. 2, that is, the delay lock unit receives the first clock signal and N delay signals for delay latch. The G delay signal is obtained as the target delay signal based on the rising edge trigger method, and the flight time of the echo signal is calculated based on the G delay signal and the count H of the time counting unit, according to the calculation formula T×H−g×U.

S905: Determine the target time of flight based on the X to-be-processed time of flights.

The target time of flight is the time difference between emitting the reference signal and receiving the echo signal, that is, a time of flight of the echo signal. In an embodiment, as the phase difference between the clock signals is uniformly increased by U/X, the step of determining the target time of flight based on the X to-be-processed time of flights is: determining the target time of flight based on averaging the X to-be-processed time of flights. The averaging can be understood as adding the X to-be-processed time of flights and then dividing by X.

In case that X=2, there are only 2 input signals, 2 groups of delayed signals, 2 clock signals, 2 delay latch units, and 2 time counting units. The first input signal corresponds to the first group of delayed signals, the first delay latch unit, and the first time counting unit. The second input signal corresponds to the second group of delayed signals, the second delay latch unit, and the second time counting unit. The period of the clock signal is T. The delay of the delay unit is t, t=U. The phase of the first input signal is 0. The phase difference between the second input signal and the first input signal is t/2. At this time, based on the time of flight measurement method in the related art shown in FIG. 2, the time resolution is the delay of the delay unit t.

In case that the first to-be-processed time of flight corresponding to the first group of delayed signals, the first delay latch unit, and the first time counting unit is H×T−G×t, where H refers to the alignment of the target delayed signal with the $H^{th}$ clock signal in the first clock signal, and G refers to the target delay unit is the $G^{th}$ delay signal out of N delay signals. Based on t=T/H, the first to-be-processed time of flight can be converted to M×t. As the phase difference between the second input signal and the first input signal is t/2, the phase difference between the second group of delayed signals and the first group of delayed signals is t/2. Based on the second group of delayed signals, the second clock signal, the second delay latch unit, and the second time counting unit, the first to-be-processed time of flight is (M+1)×t or M×t. (M+1)×t can be understood as the alignment of the G+1$^{th}$ delayed signal with the $H^{th}$ clock signal. M×t can be understood as the alignment of the $G^{th}$ delayed signal with the $H^{th}$ clock signal.

After averaging the first to-be-processed time of flight and the second to-be-processed time of flight, the target time of flight may be M×t or (M+0.5)×t, (M+0.5)×t is (2M+1)×t1, and t1=2t.

Therefore, the time resolution changes from t to t/2, the time resolution is improved by 2 times.

In the time of flight measurement method shown in FIG. 9, there are X input signals, which improves the time resolution by X times.

The time resolution is improved by the multi-phase delay unit. The time resolution is not limited by the delay of the delay unit. The accuracy of time measurement is effectively improved, and the cost of the high-precision TDC chip circuit is significantly reduced. In addition, the solution occupies fewer logic resources, thereby improving the practicality and universality of the high-precision TDC chip circuit.

Figure 10:
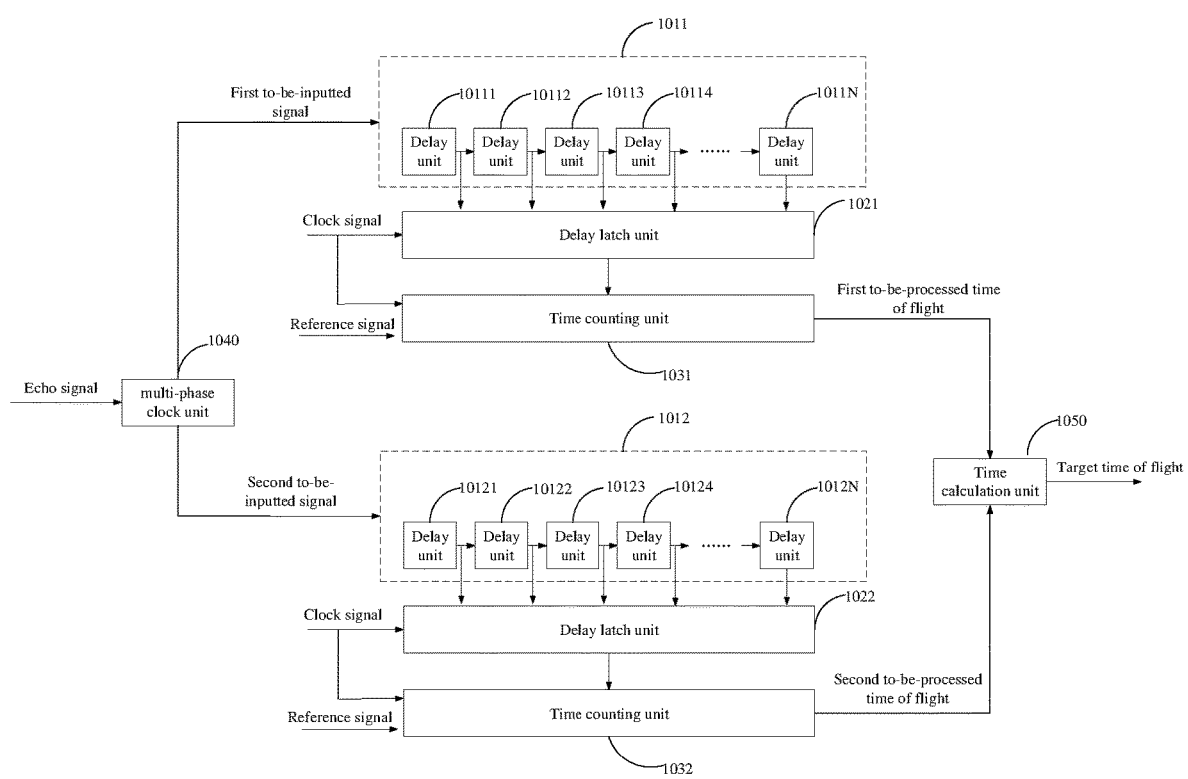
FIG. 10 is a schematic structural diagram of a time of flight measurement circuit according to an embodiment.

As shown in FIG. 10, in an embodiment, the application provides a time of flight measurement circuit, which is applicable to the time of flight measurement method shown in FIG. 10. The time of flight measurement circuit includes X×N delay units, X delay latch units, X time counting units, a multi-phase clock unit 1040, and a time calculation unit 1050.

The N delay units form one group of delay units. As shown in FIG. 10, one group of delay units 1011 includes delay units 10111, delay units 10112, delay units 10113, . . . , delay units 1011N. Another group of delay units 1012 includes delay units 10121, delay units 10122, . . . , delay units 1012N. Further includes Group X delay unit 101X (not shown). The X delay latch units include a delay latch unit 1021 and a delay latch unit 1022. The X time counting units include a time counting unit 1031 and a time counting unit 1032.

As shown in FIG. 10, the N delay units in one group of delay units 1011 are connected in sequence. Each delay latch unit is connected to each delay unit in the N delay units. Each time counting unit is connected to each delay latch unit. The multi-phase clock unit 1040 is connected to each group of delay units separately. The time calculation unit 1050 is connected to each time counting unit.

The N multi-phase delay units are configured to perform multi-phase delay processing on an echo signal to obtain X to-be-inputted signals with different phases. The X is a positive integer greater than or equal to 2.

Each group of delay units is configured to perform delay processing on each to-be-inputted signal, to obtain N delayed signals corresponding to each to-be-inputted signal. The delay of the N delayed signals is uniformly increased by U. Each N delayed signals form one group of delayed signals. The U is a delay of a delay unit. The U is a natural number greater than 0. For example, one group of delay units 1011 performs N delay processing on the first input signal to obtain one group of N delayed signals. Another group of delay units 1012 performs N delay processing on the second input signal to obtain another group of N delayed signals. The phase difference between the two groups of delayed signals is U/X. It can be understood that, the X to-be-inputted signals include the first to-be-inputted signal and the second to-be-inputted signal shown in FIG. 10.

The delay latch unit is configured to generate the result of the delay latch based on the clock signal and the corresponding N delayed signals. The clock signal can be understood as a signal with a period of T generated by the clock unit. For example, the delay latch unit 1021 generates the result of the delay latch based on the clock signal and the N delayed signals corresponding to the first to-be-inputted signal. The delay latch unit 1022 generates the result of the delay latch based on the clock signal and the N delayed signals corresponding to the second to-be-inputted signal.

The time counting unit is configured to generate the to-be-processed time of flight based on the result of the delay latch output by corresponding delay latch unit and the reference signal. The emission time can be understood as the start signal of the time counting unit, that is, the signal emitted at the same time as the laser signal that generates the echo signal. For example, the time counting unit 1031 generates the first to-be-processed time of flight based on the result output by the delay latch unit 1021 and the reference signal. The time counting unit 1032 generates the second to-be-processed time of flight based on the result output by the delay latch unit 1022 and the reference signal.

The time calculation unit 1050 is configured to calculate the average of X to-be-processed time of flights according to X to-be-processed time of flights output by X time counting units and get the target flight time. The target time of flight is the time difference between emitting the reference signal and receiving the echo signal. The X to-be-processed time of flights include the first to-be-processed time of flight and the second to-be-processed time of flight shown in FIG. 10.

For steps of completing the time of flight measurement in the above time of flight measurement circuit, refer to the time of flight measurement method shown in FIG. 9.

Embodiments of this application uses a multiphase delay unit to delay the echo signal, obtain multiple incoming signals with different phases, generate multiple flight times to be processed based on the corresponding multiple clock signals, and process the processing flight time to obtain the target flight time of the echo signal, effectively improve the accuracy of time measurement, and greatly reduce the cost of high-precision TDC chip circuit, and occupy less logic resources, in order to improve the practicality and universality of high-precision TDC chip circuit.

Based on the time of flight measurement method shown in FIG. 9, the phase difference of the to-be-inputted is required to increase uniformly by U/X, that is, the phase difference of the two adjacent signals to be input is 1/X of the delay amount of the delay unit, which means that the multi-phase clock unit has higher accuracy requirements. Therefore, embodiments of this application can reduce the accuracy requirement and cost of the multi-phase delay unit, and further improve the universality of the time of flight measurement circuit.

Figure 11:
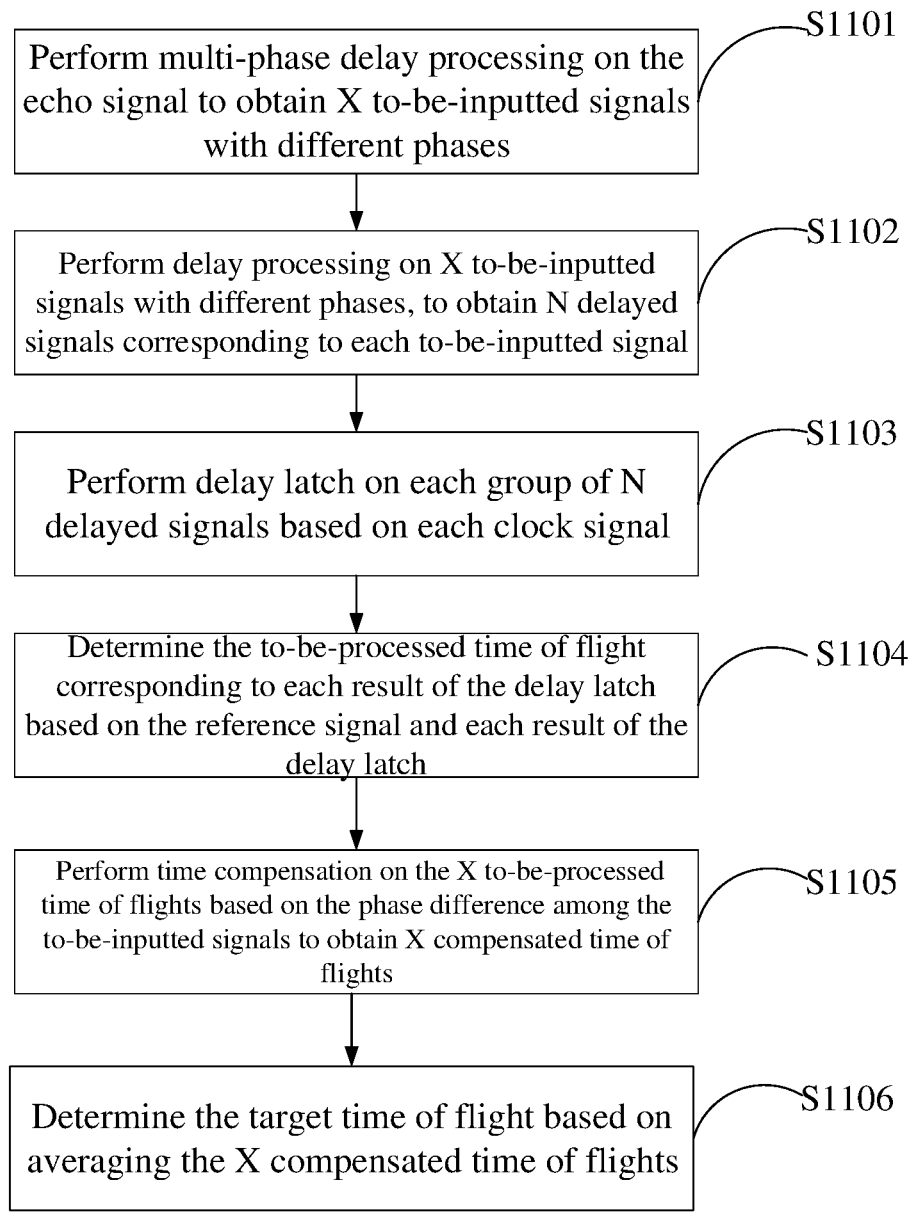
FIG. 11 is a schematic structural diagram of another time of flight measurement method according to an embodiment.

In an embodiment, as shown in FIG. 11, another time of flight measurement method is provided. The method includes the following steps:

S1101: Perform multi-phase delay processing on the echo signal to obtain X to-be-inputted signals with different phases.

The period of the clock signal is T. The delay of the delay unit is U. The X is a positive integer greater than or equal to 2. The phase difference among the X input signals is uniformly increased by Y The Y is greater than U/X. In an embodiment, the echo signal is delayed in multiple phases by the multi-phase delay unit, to output X to-be-inputted signals with different phases.

For example, the delay of the delay unit is 20 ps, and X=2. Then, the phase difference between two adjacent clock signals is greater than 10 ps, for example, 20 ps, 50 ps, and the like.

S1102: Perform delay processing on X to-be-inputted signals with different phases, to obtain N delayed signals corresponding to each to-be-inputted signal.

The delay of the N delayed signals is uniformly increased by U. Each N delayed signals form one group of delayed signals. The N is a positive integer greater than or equal to 2. One to-be-inputted signal is delayed N times to obtain one group of delayed signals. The delay of the group of delayed signals is uniformly increased by U. The phase difference of X groups of delay signals corresponding to X groups of to-be-inputted signals uniformly increased by Y.

S1103: Perform delay latch on each group of N delayed signals based on each clock signal.

The results of the delay latch include X results, one clock unit generates X clock signals. The period of the clock signal is T. Based on one clock signal, N delayed signals are delayed and latched. Based on X clock signals, each group of N delayed signals are delayed and latched. The delay latch on N delay latch units based on one clock signal can be referred to the time of flight measurement method in FIG. 2 and the time of flight measurement method in FIG. 3.

S1104: Determine the to-be-processed time of flight corresponding to each result of the delay latch based on the reference signal and each result of the delay latch.

The to-be-processed time of flight includes X to-be-processed time of flights. The reference signal and each result of the delay latch can be referred to the time of flight measurement method in FIG. 1 and the time of flight measurement method in FIG. 3.

S1105: Perform time compensation on the X to-be-processed time of flights based on the phase difference among the to-be-inputted signals to obtain X compensated time of flights.

From step S1101, the phase difference between the X input signals is uniformly increased by Y Therefore, the time compensation amount is $\Delta T=Y-U/X$. The X to-be-processed time of flights are compensated based on the time compensation amount, to obtain the X compensated time of flights.

For example, the delay of the delay unit is 20 ps, and X=5. The phase difference between the 5 to-be-inputted signals is uniformly increased by 50 ps. Therefore, the time compensation amount $\Delta T=Y-U/X=45$ ps. The 5 delay latch units generate the 5 to-be-processed time of flights based on the 5 corresponding time counting units and the 5×N delayed signals corresponding to the 5 to-be-inputted signals. The 5 to-be-processed time of flights are T1, T2, T3, T4, and T5. Subtracting 45 ps from T1, T2, T3, T4, and T5, the 5 compensated time of flights are obtained.

S1106: Determine the target time of flight based on averaging the X compensated time of flights.

The target time of flight is determined based on averaging the X compensated time of flights. The averaging can be understood as (T1+T2+T3+T4+T5+ . . . TN)/X. The target time of flight is the time difference between emitting the reference signal and receiving the echo signal. That is, the time of flight of the echo signal.

The improving time resolution based on the time of flight measurement method in this embodiment of this application can be referred to the time of flight measurement method shown in FIG. 9.

The time resolution is improved by the multi-phase delay unit. The time resolution is not limited by the delay of the delay unit. The accuracy of time measurement is effectively improved, and the cost of the high-precision TDC chip circuit is significantly reduced. In addition, the solution occupies fewer logic resources, thereby improving the practicality and universality of the high-precision TDC chip circuit.

Figure 12:
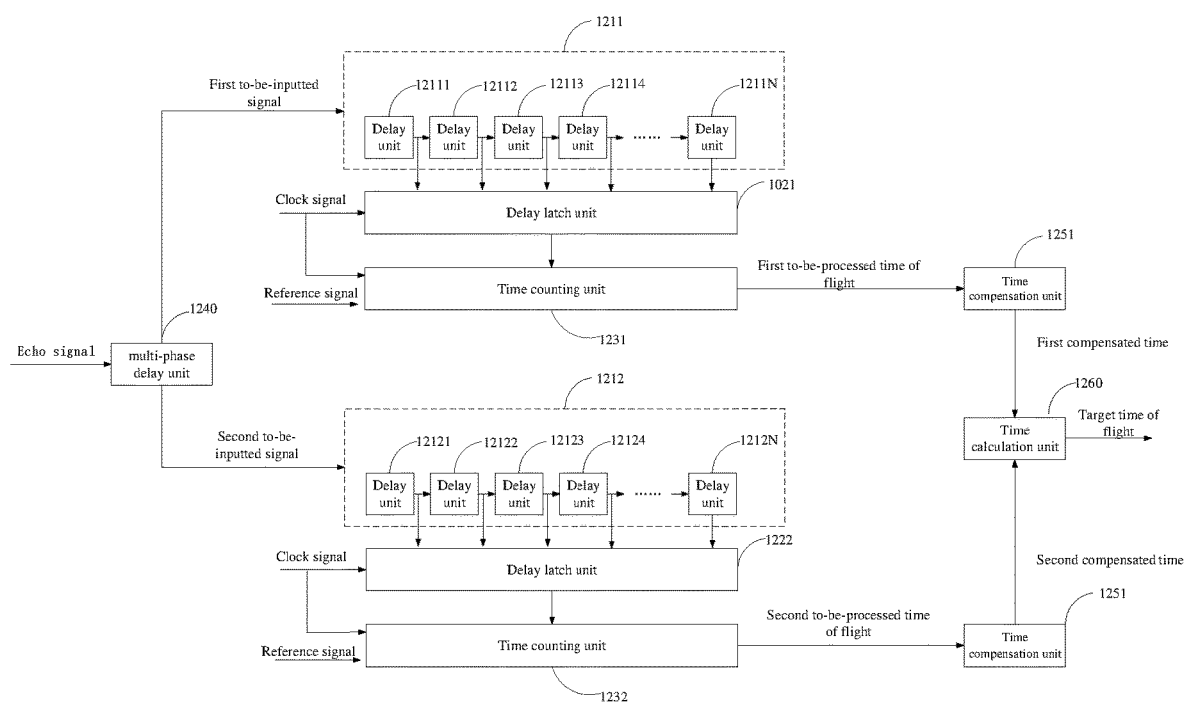
FIG. 12 is a schematic structural diagram of a time of flight measurement circuit according to an embodiment.

As shown in FIG. 12, in an embodiment this application proposes a time of flight measurement circuit. The time of flight measurement circuit includes: X×N delay units, X delay latch units, X time counting units, multi-phase delay units 1240, X time compensation units and a time calculation unit 1260.

Where, N delay units form a group of delay units. As shown in FIG. 12, a group of delay units 1211 includes delay units 12111, delay units 12112, delay units 12113, . . . , delay units 1211N, Another group of delay units 1212 includes delay units 12121, delay units 12122, . . . , delay units 1212N, and also includes an X group of delay units 101X (not shown in the figure), X delay latch units including a delay latch unit 1221 and a delay latch unit 1222, the X time counting units include a time counting unit 1231 and a time counting unit 1232.

As shown in FIG. 12, the N delay units in a group of delay units 1211 are connected in sequence, each delay latch unit is connected to each of the N delay units, and each time counting unit is connected to each delay latch unit in a one-to-one correspondence, the multi-phase delay unit 1240 is connected to each group of delay units respectively, and the time calculation unit is connected to each time counting unit.

N multi-phase delay units are used to perform multi-phase delay processing on the echo signal to obtain X signals to-be-inputted with different phases; where X is a positive integer greater than or equal to 2, the phase difference of X to-be-inputted signals uniformly increased by Y, where Y is greater than U/X.

Each group of delay units is used to delay each to-be-inputted signal, and obtain N delay signals corresponding to each to-be-inputted signal; wherein, the delay of the N delay signals uniformly increased by U, each N delay signals are a group of delay signals, U is the delay amount of the delay unit, and U is a natural number greater than 0. For example, a group of delay units 1211 delays the first to-be-inputted signal N times to obtain a group of N delayed signals, and another group of delay units 1212 delays the second to-be-inputted signal N times, another group of N delayed signals is obtained, and the phase difference between the two groups of delayed signals is U/X. The X to-be-inputted signals include the first to-be-inputted signal and the second to-be-inputted signal shown in FIG. 12.

The delay latch unit is used to generate a delay latch result based on the clock signal and the corresponding N delay signals. The clock signal can be understood as a signal with a period of T generated based on the clock unit. For example, the delay latch unit 1221 generates a delay latch result based on the clock signal and the N delay signals corresponding to the first to-be-inputted signal. The delay latch unit 1222 generates a delay latch result based on the clock signal and the N delay signals corresponding to the second to-be-inputted signal.

The time counting unit is configured to generate the to-be-processed time of flight based on the result of the delay latch output by the corresponding delay latch unit and the reference signal. The emission time can be understood as the start signal that starts the time counting unit, the signal that is emitted at the same time as the laser signal that generates the echo signal. For example, the time counting unit 1231 generates a first to-be-processed time of flight based on the result output by the delay latch unit 1221 and the reference signal, and the time counting unit 1232 generates a second to-be-processed time of flight based on the result output by the delay latch unit 1222 and the reference signal.

The time compensation unit is used to perform time compensation on the X to-be-processed time of flights based on Y, to obtain X compensated time of flights. In an embodiment, the phase differences of the X clock signals increase uniformly, Y Greater than U/X, the time compensation amount for X pending time of flights is ΔT=Y−U/X. For example, the time compensation unit 1251 performs time compensation on the first to-be-processed time of flight to obtain the first compensated time of flight, and the time compensation unit 1252 performs time compensation on the second to-be-processed time of flight to obtain the second compensated time of flight. The time compensation for each time of flight to be processed by each time compensation unit is shown in FIG. 11 above.

In an embodiment, the time compensation unit and the time calculation unit 1250 are integrated into the same computing chip. The X time compensation units are multiple sub-units included in the time calculation unit 1250. The time calculation unit 1250 uses the X time compensation units to perform time compensation on the corresponding X time of flights to be processed. In some embodiments, the X time compensation units are multiple virtual modules included in the time calculation unit 1250, and the X time compensation units are used to represent that the time calculation unit 1250 has the function of time compensation for X time of flights to be processed.

The time calculation unit 1250 is used to obtain the target time of flight by averaging the X to-be-processed time of flights based on the X to-be-processed time of flights output by the X time counting units. The target time of flight is the time difference between emitting the reference signal and receiving echo signal. The X to-be-processed time of flights include the first to-be-processed time of flight and the second to-be-processed time of flight shown in FIG. 10.

The steps for completing the time of flight measurement by the above-mentioned time of flight measurement circuit refer to the time of flight measurement method shown in FIG. 11.

Embodiments of this application performs multi-phase delay on the echo signal through a multi-phase delay unit, obtains multiple signals to-be-inputted with different phases, generates multiple to-be-processed time of flights based on the corresponding multiple clock signals, and processes the time of flights to be processed. Obtaining the target time of flight of the echo signal, effectively improves the accuracy of time measurement, and greatly reduces the cost of high-precision TDC chip circuits. And it occupies less logic resources to improve the practicality and universality of the high-precision TDC chip circuit; by performing time compensation on the to-be-processed time of flight, the time of flight measurement circuit can reduce the accuracy requirements and cost of the multi-phase clock unit. Without reducing the time resolution of the TDC chip circuit, the universality and working reliability of the time of flight measurement circuit of the present disclosure can be further improved.

Figure 13:
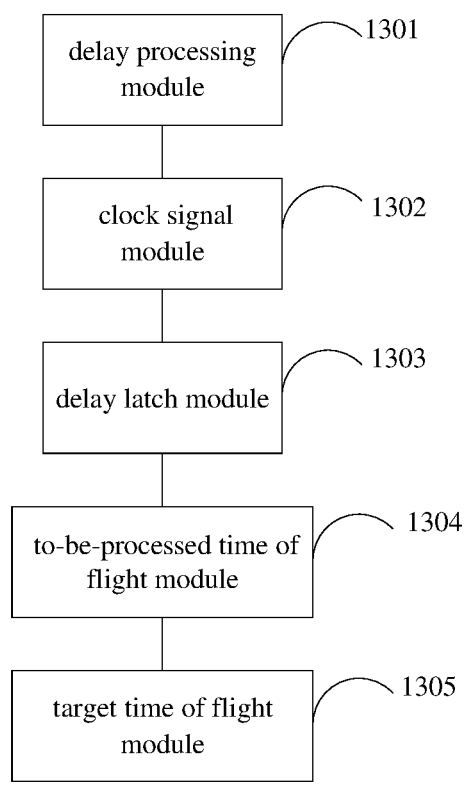
FIG. 13 is a schematic structural diagram of a time of flight measurement apparatus according to an embodiment.

Refer to FIG. 13, which shows a schematic structural diagram of a time of flight measurement device provided by an embodiment. The time of flight measurement device can be implemented as all or part of the device through software, hardware, or a combination of both. The time of flight measurement device includes a delay processing module 1301, a clock signal module 1302, a delay latch module 1303, a to-be-processed time of flight module 1304 and a target time of flight module 1305.

The delay processing module 1301 is used to perform delay processing on the echo signal to obtain N delay signals; wherein the delay of the N delay signals increased uniformly by U, and U is the delay of the delay unit. U is a natural number greater than 0.

The clock signal module 1302 is used to generate X clock signals with different phases based on the multi-phase clock unit; where X is a positive integer greater than or equal to 2.

The delay latch module 1303 performs delay latch on the N delay signals based on each of the clock signals respectively; wherein the delay latch results include X results.

The to-be-processed time of flight module 1304 is configured to combine the reference signal and the result of each delay latch to determine the to-be-processed time of flight corresponding to the result of each delay latch; wherein, the time of flight to be processed Including X time of flights.

The target time of flight module 1305 is configured to determine the target time of flight based on the X to-be-processed time of flights; the target time of flight is the time difference between emitting the reference signal and receiving the echo signal.

In some embodiments, the phase differences of the X clock signals increase uniformly by U/X;

The target time of flight module 1305 executes: the target time of flight is determined by averaging the X to-be-processed time of flights.

In some embodiments, the phase differences of the X clock signals increase uniformly; wherein Y is greater than U/X.

The target time of flight module 1305 includes: a compensation unit configured to perform time compensation on the X to-be-processed time of flights based on the Y, to obtain X compensated time of flights; wherein the time compensation amount ΔT for the X time of flights to be processed is ΔT=Y−U/X; an averaging unit is used to determine the target time of flight based on an average calculation based on the X compensation time of flights.

In some embodiments, the N delay signals are generated by a group of delay units, and the group of delay units includes N delay units.

In some embodiments, the N delay signals are generated by X×N delay units; each N delay units form a group of delay units, and each group of delay units generates a group of delay signals, each group of delay signals includes the N delay signals which delay amounts are uniformly increased by U, and each group of delay units corresponds to each of the clock signals;

The delay latch module 1303 executes: delay latching is performed based on each clock signal and each group of delay signals corresponding to each clock signal.

Embodiments of this application generates multiple clock units with different phases through a multi-phase clock unit, and generates multiple time of flights to be processed based on corresponding groups of delay signals. The time of flights to be processed are processed to obtain the target time of flight of the echo signal. The time of flight is generated from a clock signal and a group of delay signals, effectively improving the accuracy of time measurement, and greatly reduces the cost of high-precision TDC chip circuits and occupies less logic resources to improve the practicality and universality of high-precision TDC chip circuits.

Figure 14:
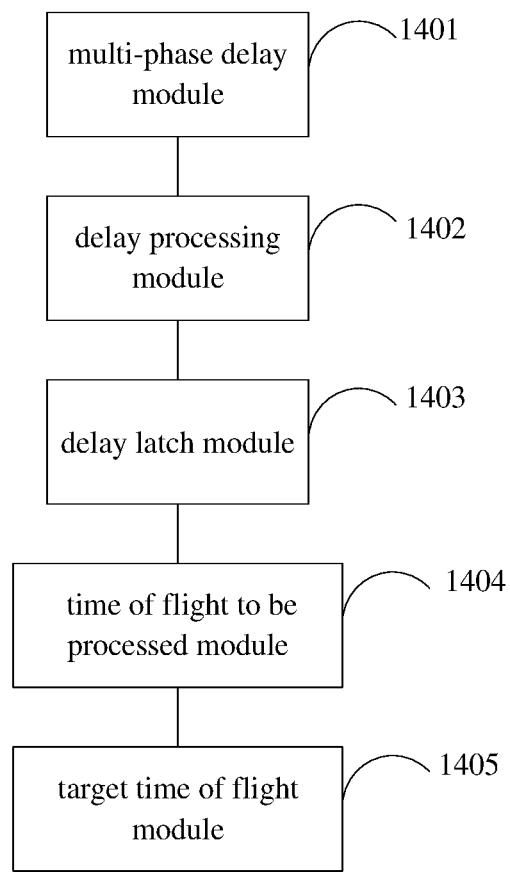
FIG. 14 is a schematic structural diagram of a time of flight measurement apparatus according to an embodiment.

Refer to FIG. 14, which shows a schematic structural diagram of a time of flight measurement device provided by an embodiment. The time of flight measurement device can be implemented as all or part of the device through software, hardware, or a combination of both. The time of flight measurement device includes a multi-phase delay module 1401, a delay processing module 1402, a delay latch module 1403, a time of flight to be processed module 1404 and a target time of flight module 1405.

The multi-phase delay module 1401 is used to perform multi-phase delay processing on the echo signal to obtain X to-be-inputted signals with different phases; where X is a positive integer greater than or equal to 2.

The delay processing module 1402 is used to perform delay processing on the X to-be-inputted signals with different phases, respectively, to obtain N delay signals corresponding to each of the to-be-inputted signals; where the delay amount of the N delay signals increases uniformly with U, each N delay signals is a group of delay signals, U is the delay amount of the delay unit, U is a natural number greater than 0.

Delay latch module 1403, configured to perform delay latch on each group of N delay signals based on each of the clock signals; wherein the results of the delay latch include X result.

The to-be-processed time of flight module 1404 is used to combine the reference signal and the result of the delay latch to determine the to-be-proceed time of flight corresponding to the result of each delay latch; wherein the to-be-processed time of flight includes X times.

The target time of flight module 1405 is used to determine the target time of flight according to the X to-be-processed time of flights; the target time of flight is the time difference between emitting the reference signal and receiving the echo signal.

In some embodiments, the phase differences of the X to-be-inputted signals increase uniformly by U/X, the target time of flight is determined by averaging the X to-be-processed time of flights.

In some embodiments, the phase differences of the X to-be-inputted signals increase uniformly; where Y is greater than U/X.

Target time of flight module 1405 includes: a compensation unit that performs time compensation on the X to-be-processed time of flights based on Y, to obtain X compensated time of flights; wherein the time compensation amount $\Delta T$ for the X to-be-processed time of flights is $\Delta T=Y-U/X$; an averaging unit determines the target time of flight based on an average calculation on the X compensation time of flights.

Embodiments of this application performs multi-phase delay on the echo signal through a multi-phase delay unit, obtains multiple signals to-be-inputted with different phases, generates multiple time of flights to be processed based on the corresponding multiple clock signals, and processes the time of flights to be processed. Obtaining the target time of flight of the echo signal solves the problem that the resolution of TDC time ranging is limited by the delay amount of the delay unit, effectively improves the accuracy of time measurement, and greatly reduces the cost of high-precision TDC chip circuits. And occupies less logic resources to improve the practicality and universality of high-precision TDC chip circuits.

When the time of flight measurement device provided in the above embodiment performs the time of flight measurement method, the division of the above functional modules is used as an example. Module completion means dividing the internal structure of the device into different functional modules to complete all or part of the functions described above. For details of the implementation process, please refer to the method embodiment.

Embodiments of the present application also provide a computer storage medium, which can store multiple instructions, and the instructions are suitable for being loaded and executed by a processor as described in the embodiments shown in FIGS. 1-2. For the time of flight measurement method, please refer to the specific description of the embodiment shown in FIGS. 1-2 for the specific execution process.

Embodiments of the present application also provides a computer program product, which stores at least one instruction. The at least one instruction is loaded by the processor and executes the time of flight of the embodiment shown in FIGS. 1-12. For the measurement method and specific execution process, please refer to the specific description of the embodiment shown in FIGS. 1 to 12, and will not be described again here.

Figure 15:
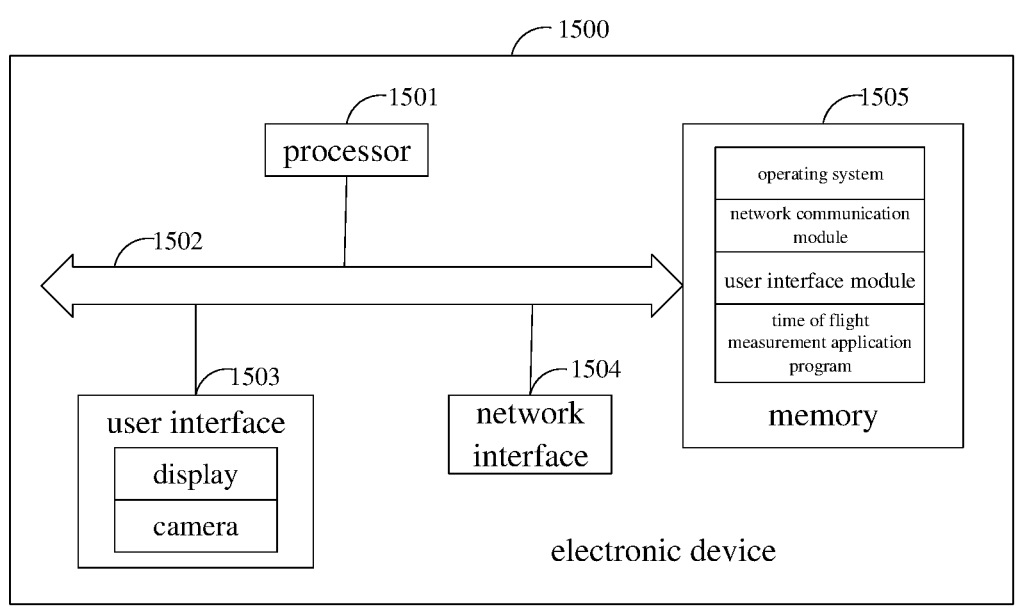
FIG. 15 is a schematic structural diagram of an electronic device according to an embodiment.

Refer to FIG. 15, which provides a schematic structural diagram of an electronic device according to an embodiment. As shown in FIG. 15, the electronic device 1500 may include: at least one processor 1501, at least one network interface 1504, a user interface 1503, a memory 1505, and at least one communication bus 1502.

The communication bus 1502 is used to realize connection communication between these components.

The user interface 1503 may include a display screen (Display) and a camera (Camera), and the user interface 1503 may also include a standard wired interface and a wireless interface. The network interface 1504 may optionally include a standard wired interface and a wireless interface (such as a WI-FI interface).

The processor 1501 may include one or more processing cores. The processor 1501 uses various interfaces and lines to connect various parts of the entire server 1500, and executes the server by running or executing instructions, programs, code sets or instruction sets stored in the memory 1505, and calling data stored in the memory 1505. 1500 of various functions and processing data. The processor 1501 can use at least one of Digital Signal Processing (DSP), Field-Programmable Gate Array (FPGA), and Programmable Logic Array (PLA) implemented in hardware form. The processor 1501 may integrate one or a combination of a Central Processing Unit (CPU), a Graphics Processing Unit (GPU), a modem, etc. Among them, the CPU mainly handles the operating system, user interface, and applications; the GPU is responsible for rendering and drawing the content that needs to be displayed on the display; and the modem is used to handle wireless communications. The above-mentioned modem may not be integrated into the processor 1501 and may be implemented by a separate chip.

The memory 1505 may include random access memory (RAM) or read-only memory. Optionally, the memory 1505 includes non-transitory computer-readable storage medium. Memory 1505 may be used to store instructions, programs, codes, groups of codes, or groups of instructions. The memory 1505 may include a program storage area and a data storage area, where the program storage area may store instructions for implementing the operating system, instructions for at least one function (such as touch function, sound playback function, image playback function, etc.), Instructions, etc., used to implement each of the above method embodiments; the storage data area can store data, etc. involved in each of the above method embodiments. The memory 1505 may optionally be at least one storage device located remotely from the aforementioned processor 1501. As shown in FIG. 15, memory 1505, which is a computer storage medium, may include an operating system, a network communication module, a user interface module, and a time of flight measurement application program.

In the electronic device 1500 shown in FIG. 15, the user interface 1503 is mainly used to provide an input interface for the user and obtain data input by the user; and the processor 1501 can be used to call the time of flight measurement application stored in the memory 1505, and perform the following operations: delay processing is performed on the echo signal to obtain N delay signals; wherein, the delay amount of the N delay signals increases uniformly by U, U is the delay amount of the delay unit, and U is a natural number greater than 0; X clock signals with different phases are generated based on the multi-phase clock unit; where X is a positive integer greater than or equal to 2; perform delay latching on the N delay signals based on each of the clock signals respectively; wherein the results of the delay latch include X results; combining the reference signal and the result of each delay latch, determine the time of flight to be processed corresponding to the result of each delay latch; wherein the time of flight to be processed includes X times; the target time of flight is determined based on the X to-be-processed time of flights; the target time of flight is the time difference between emitting the reference signal and receiving the echo signal.

In some embodiments, the phase differences of the X clock signals increase uniformly by U/X, and when the processor 1501 performs the determination of the target flight time based on the X to-be-processed flight times, the target time of flight is determined by averaging the X to-be-processed time of flights.

In some embodiments, the phase differences of the X clock signals increase uniformly; wherein Y is greater than U/X, and the processor 1501 executes: after time compensation is performed on the X to-be-processed time of flights based on the Y, X compensated time of flights are obtained; wherein, the time compensation amount $\Delta T$ for the X to-be-processed time of flights is $\Delta T = Y - U/X$; the target time of flight is determined based on an average calculation based on the X compensation time of flights.

In some embodiments, the N delay signals are generated by a group of delay units, and the group of delay units includes N delay units.

In some embodiments, the N delay signals are generated by X×N delay units; each N delay units form a group of delay units, and each group of delay units generates a group of delay signals, each group of delay signals includes the N delay signals whose delay amounts are evenly increased by U, and each group of delay units corresponds to each of the clock signals, and the processor 1501 executes When delay latching the N delay signals based on each of the clock signals, execute: perform delay latching based on each clock signal and each group of delay signals corresponding to each clock signal.

Embodiments of the present application uses a multi-phase clock unit to generate multiple clock units with different phases, and generates multiple to-be-processed time of flights based on corresponding multiple groups of delay signals. The to-be-processed time of flights are processed to obtain the target time of flight of the echo signal, effectively improving the accuracy of time measurement, and significantly reduce the cost of high-precision TDC chip circuits and occupy less logic resources to improve the practicality and universality of high-precision TDC chip circuits.

In an embodiment, the processor 1501 can be used to call another time of flight measurement application stored in the memory 1505, and perform the following operations: perform multi-phase delay processing on the echo signal to obtain X to-be-inputted signals with different phases; where X is a positive integer greater than or equal to 2; perform delay processing on the X to-be-inputted signals with different phases respectively, to obtain N delay signals corresponding to each to-be-inputted signal; wherein, the delay amounts of the N delay signals increase uniformly by U, and each time N delay signals are a group of delay signals, U is the delay amount of the delay unit, and U is a natural number greater than 0; perform delay latching on each group of N delay signals based on each of the clock signals; wherein the delay latch results include X results; combining the reference signal and the result of the delay latch, determine the to-be-processed time of flight corresponding to the result of each delay latch; wherein the time of flight to be processed includes X times; determining the target time of flight based on the X to-be-processed time of flights; the target time of flight is the time difference between emitting the reference signal and receiving the echo signal.

In some embodiments, the phase difference of the X to-be-inputted signals increases uniformly by U/X, and when the processor 1501 performs the determination of the target flight time according to the X to-be-processed flight time, the execution is: determining the target time of flight by averaging the X to-be-processed time of flights.

In some embodiments, the phase difference of the X to-be-inputted signals increases uniformly; where Y is greater than U/X, processor 1501 performs the determination of the target flight time according to the X to-be-processed time of flight, execution: obtaining X compensated time of flights after time compensation is performed on the X to-be-processed time of flights based on the Y; wherein, the time compensation amount $\Delta T$ for the X to-be-processed time of flights is $\Delta T = Y - U/X$; determining the target time of flight based on an average calculation based on the X compensation time of flights.

Embodiments of this application performs multi-phase delay on the echo signal through a multi-phase delay unit, obtains multiple signals to be input with different phases, generates multiple time of flights to be processed based on the corresponding multiple clock signals, and finally processes the time of flights to be processed. Obtaining the target time of flight of the echo signal solves the problem that the resolution of TDC time ranging is limited by the delay amount of the delay unit, effectively improves the accuracy of time measurement, and greatly reduces the cost of high-precision TDC chip circuits. And it occupies less logic resources to improve the practicality and universality of high-precision TDC chip circuits.

What is claimed is:

1. A time of flight measurement method, comprising:
    performing delay processing on an echo signal to obtain N delayed signals, where a delay of the N delayed signals is uniformly increased by U, U is a delay of a delay unit, and U is a natural number greater than 0;
    generating X clock signals with different phases based on a multi-phase clock unit, where X is an integer greater than or equal to 2;
    performing delay latch on the N delayed signals based on each of the X clock signals, where a result of the delay latch includes X results;
    determining a to-be-processed time of flight based on the reference signal and each result of the delay latch, where the to-be-processed time of flight includes X times; and
    determining a target time of flight based on the X to-be-processed time of flights, where the target time of flight is a time difference between emitting the reference signal and receiving the echo signal.

2. The method according to claim 1, wherein a phase difference among the X clock signals is uniformly increased by U/X; and
    wherein determining the target time of flight based on the X to-be-processed time of flights comprises:
    determining the target time of flight based on averaging the X to-be-processed time of flights.

3. The method according to claim 1, wherein a phase difference among the X clock signals is uniformly increased by Y; where Y is greater than U/X; and
    wherein determining the target time of flight based on the X to-be-processed time of flights comprises:
    obtaining X compensated time of flights based on time compensation of the X to-be-processed time of flights, where a time compensation amount $\Delta T=Y-U/X$; and
    determining the target time of flight based on averaging the X compensated time of flights.

4. The method according to claim 1, wherein the N delayed signals are generated by one group of delay units, and the one group of delay units includes N delay units.

5. The method according to claim 1, wherein the N delayed signals are generated by X×N delay units; each N delay units form one group of delay units, each group of delay units generate one group of delayed signals, each group of delayed signals includes N delayed signals uniformly increased by U, and each group of delay units is corresponding to each clock signal; and
    wherein performing delay latch on the N delayed signals based on each clock signal comprises:
    performing delay latch on each group of N delayed signals corresponding to each clock signal based on each clock signal.

6. A time of flight measurement method, comprising:
    performing multi-phase delay processing on an echo signal to obtain X to-be-inputted signals with different phases, where X is an integer greater than or equal to 2;
    performing delay processing on each to-be-inputted signal with different phases separately, to obtain N delayed signals corresponding to each to-be-inputted signal; where a delay of the N delayed signals is uniformly increased by U, U is a delay of a delay unit, and U is a natural number greater than 0;
    performing delay latch on each group of N delayed signals based on each clock signal; where a result of the delay latch includes X results;
    determining a to-be-processed time of flight based on the reference signal and each result of the delay latch; where the to-be-processed time of flight include X times; and
    determining a target time of flight based on the X to-be-processed time of flights, where the target time of flight is a time difference between emitting the reference signal and receiving the echo signal.

7. The method according to claim 6, wherein a phase difference between the X to-be-inputted signals is uniformly increased by U/X; and
    wherein determining the target time of flight based on the X to-be-processed time of flights comprises:
    determining the target time of flight based on averaging the X to-be-processed time of flights.

8. The method according to claim 6, wherein a phase difference between the X input signals is uniformly increased by Y; where Y is greater than U/X; and
    wherein determining the target time of flight based on the X to-be-processed time of flights comprises:
    obtaining X compensated time of flights based on time compensation of the X to-be-processed time of flights, where a time compensation amount $\Delta T=Y-U/X$; and
    determining the target time of flight based on averaging the X compensated time of flights.

9. A time of flight measurement circuit, comprising:
    N delay units, X time counting units, X delay latch units, a multi-phase clock unit, and a time calculation unit;
    wherein the N delay units are connected in sequence, each delay latch units is connected to each of the N delay units, each of the time counting units is correspondingly connected to each delay latch unit, the multi-phase clock unit is connected to each of the time counting units and each of the delay latch units separately, and the time calculation unit is connected to each of the time counting units;
    the N delay units are configured to perform delay processing on an echo signal to obtain N delayed signals; where a delay of the N delayed signals is uniformly increased by U, U is a delay of a delay unit, and U is a natural number greater than 0;
    the multi-phase clock unit is configured to generate X clock signals with different phases; where X is an integer greater than or equal to 2;
    the delay latch unit is configured to generate a result of delay latch based on each corresponding clock signal and each corresponding N delayed signals;
    the time counting unit is configured to generate a to-be-processed time of flight based on a result of delay latch output by a corresponding delay latch unit and a reference signal; and
    the time calculation unit is configured to determine a target time of flight based on X to-be-processed time of flights, where the target time of flight is a time difference between emitting the reference signal and receiving the echo signal.

10. The circuit according to claim 9, wherein
    a phase difference between the X clock signals is uniformly increased by U/X; and
    the time calculation unit is configured to determine the target time of flight based on averaging the X to-be-processed time of flights.

11. The circuit according to claim 9, wherein
    a phase difference between the X clock signals is uniformly increased by Y; where Y is greater than U/X;
    the circuit further includes X time compensation units;
    the time calculation unit is correspondingly connected to the X time compensation units, each of the time compensation units is correspondingly connected to each of the time counting units;
    each of the time compensation units is configured to obtain X compensated time of flights based on time compensation of the X to-be-processed time of flights, where a time compensation amount $\Delta T=Y-U/X$; and
    the time calculation unit is configured to determine the target time of flight based on averaging the X compensated time of flights.

12. The circuit according to claim 9, wherein
    the circuit further includes (X−1)×N delay units;
    each N delay units form one group of delay units, each group of delay units generate one group of delayed signals, each group of delayed signals include N delayed signals uniformly increased by U, and each group of delay units is corresponding to each clock signal; and X groups of delay units is connected in one-to-one correspondence with X delay lock units.

* * * * *